US008666251B2

United States Patent
Zhao et al.

(10) Patent No.: US 8,666,251 B2
(45) Date of Patent: Mar. 4, 2014

(54) ELECTRONIC DISPERSION COMPENSATION SYSTEM AND METHOD

(75) Inventors: Jian Zhao, Cork (IE); Mary McCarthy, Cork (IE)

(73) Assignee: University College Cork—National University of Ireland Cork (IE)

( * ) Notice: Subject to any disclaimer, the term of this patent is extended or adjusted under 35 U.S.C. 154(b) by 111 days.

(21) Appl. No.: 13/380,441

(22) PCT Filed: Jun. 23, 2010

(86) PCT No.: PCT/EP2010/058936
§ 371 (c)(1),
(2), (4) Date: Mar. 9, 2012

(87) PCT Pub. No.: WO2010/149714
PCT Pub. Date: Dec. 29, 2010

(65) Prior Publication Data
US 2012/0155881 A1   Jun. 21, 2012

Related U.S. Application Data

(60) Provisional application No. 61/219,679, filed on Jun. 23, 2009.

(30) Foreign Application Priority Data

Jun. 23, 2009 (EP) .................................... 09163524
Sep. 17, 2009 (IE) .................................. S2009/0709

(51) Int. Cl.
*H04J 14/02* (2006.01)
*H04B 10/06* (2011.01)

(52) U.S. Cl.
USPC ............. 398/81; 398/206; 398/208; 398/209; 398/210

(58) Field of Classification Search
USPC .............................. 398/81, 206, 208, 209, 210
See application file for complete search history.

(56) References Cited

U.S. PATENT DOCUMENTS 6,791,995 B1 * 9/2004 Azenkot et al. ............... 370/436
7,184,478 B2   2/2007 Popescu et al.
(Continued)

FOREIGN PATENT DOCUMENTS

WO   2006131904 A1   12/2006

OTHER PUBLICATIONS

McCarthy et al, Low-cost receiver side electronic dispersion compensation of the full optical field (published in Optical Fibre Communications and Electronic Signal Processing, Dec. 2005).*

(Continued)

*Primary Examiner* — Leslie Pascal
*Assistant Examiner* — Casey Kretzer
(74) *Attorney, Agent, or Firm* — Volpe and Koenig, P.C.

(57) ABSTRACT

The invention provides a system and method, for an optical communication network to compensate impairments in the network, using electronic dispersion compensation, said system comprising optical means comprising two or more optical-to-electrical converters for generating at least two electrical signals, comprising amplitude and instantaneous frequency of a received distorted optical signal, and an electrical circuit adapted to perform a full-field reconstruction of the received distorted optical signal using said electrical signals. The system is characterised by a dispersive transmission line circuit with compensation parameters updated at a selected rate to process said full-field reconstructed signal and compensate for coarse chromatic dispersion; and an adaptive electronic equalization circuit with compensation parameters updated at a rate faster than those in the said dispersive transmission line circuit to provide a fine impairment compensation of said reconstructed signals. The system and method of the invention achieves low-cost long-distance transmission, up to 2000 km, while maintaining the fast-adaptive compensation capability and provide a method for transparent long-haul and metro-optical networks.

28 Claims, 12 Drawing Sheets

(56) References Cited

U.S. PATENT DOCUMENTS

| | | | |
|---|---|---|---|
| 7,266,310 | B1 | 9/2007 | Savory et al. |
| 7,382,984 | B2 | 6/2008 | McNicol et al. |
| 2006/0013597 | A1* | 1/2006 | Crivelli et al. ............... 398/208 |
| 2007/0064845 | A1 | 3/2007 | Phanse et al. |
| 2009/0208216 | A1* | 8/2009 | Ellis et al. ..................... 398/81 |

OTHER PUBLICATIONS

McCarthy et al, Full field receiver side processing for electronic dispersion compensation (published in Digest of the IEEE/LEOS Summer Topical Meetings, Jul. 2008).*

Zhao et al, Chromatic Dispersion Compensation Using Full Optical-Field Maximum-Likelihood Sequence Estimation (published in Conference on Optical Fiber Communication, Mar. 2009).*

Zhao, et al., "Mitigation of Pattern Sensitivity in Full-Field Electronic Dispersion Compensation", IEEE Photonics Technology Letters, vol. 21, No. 1, pp. 48-50 (Jan. 2009).

Bosco, "Long-Distrance Effectiveness of MLSE IMDD Receivers", IEEE Photonics Technology Letters, vol. 18, No. 9, pp. 1037-1039 (May 2006).

Farbert et al., "Performance of a 10.7 Gb/s Receiver with Digital Equaliser using Maximum Likelihood Sequence Estimation", 30st European Conference on (2004), Optical Communication 2004 ECOC 2004.

Taylor, "Coherent Detection for Optical Communications using Digital Signal Processing", Optical Fibert Communication Conference (OFC), Anaheim, CA (Mar. 2007).

McGhan, "Electronic Dispersion Compensation", Optical Fiber Communication Conference (OFC), Anaheim, California (Mar. 2006).

Nakamura et al., "Advances in 40G Electronic Equalizers", Optical Fiber Communication Conference, (OFC), Anaheim, CA, (Mar. 2007).

Jiang et al., "Advances in SiGe Ics for 40 Gb/s signal equalization", Optical Fiber Communication Conference (OFC), Anaheim, CA, (Mar. 2006).

* cited by examiner

ELECTRONIC DISPERSION COMPENSATION SYSTEM AND METHOD

FIELD OF THE INVENTION

The invention relates to a communication system and method. In particular the invention relates to an electronic dispersion compensation (EDC) system and method, for use in an optical communication system.

BACKGROUND TO THE INVENTION

Metro and long-haul transmission at high data rate is critical to the substantial expansion of broadband services, especially with the growth of services such as YouTube and BBC iPlayer. However, as the capacity of optical transmission systems grows, optical impairments resulting in signal degradation become prominent and require careful compensation. Among them, chromatic dispersion (CD) is the most important impairment which can limit the transmission reach to less than 100 km for 10 Gbit/s OOK signal and 6 km at 40 Gbit/s. The commercial optical networks employ in-line dispersion compensation fibre (DCF), which is bulky and expensive with significant power attenuation. It's length has to be manually adjusted to achieve proper CD compensation with the result that link provisioning is expensive and time consumption.

Electronic dispersion compensation (EDC) has attracted much interest recently for extending reach in legacy multimode optical fiber as well as in metro and long-haul optical transmission systems. Its advantages compared to the optical compensation method include:

- Reduced costs by eliminating the need for DCF modules including the cost of DCFs and the associated cost for compensating the loss from the DCFs.
- Simplification of the deployment and configuration
- Flexible and adaptive compensation required in dynamic optical networks.
- Easy for integration in transmitter and receiver EDC can be categorized into transmitter-side EDC and receiver-side EDC. Transmitter-side EDC, as shown in FIG. 1, generates pre-distorted optical pulse shape for signal modulation according to the amount of dispersion to be compensated. In such a technique, the pre-distortion parameters are preset according to the information given by the CD for each link. However, the optimum setting often changes due to different routing paths and waveform changes arising from fibre nonlinearity, transmitter chirps etc. Because the errors are detected at the receiver, the feedback time for adaptive compensation is unacceptable due to the round-trip time. Transmitter side EDC is disclosed in more detail in U.S. Pat. No. 7,382,984, McNicol et al and in a paper publication entitled "Electronic dispersion compensation", in *Proc. Optical Fiber Communication Conference* (OFC) 2006, paper OWK1. McGhan et al.

In contrast, receiver-side EDC, which can adapt quickly to changes in link conditions, is of particular value for future transparent optical networks where the re-configurability of the add-nodes and drop-nodes causes the transmission paths to vary. It can also be used for compensating polarization mode dispersion (PMD). PMD is an impairment which would severely degrade system performance for transmission distance beyond several hundred kilometers at 10 Gbit/s. Different from CD, PMD which occurs as a result of birefringence in optical fibre depends on stress and vibration as well as random changes in the state of light polarization, and may dynamically change as time in a scale of milliseconds (ms). Up to now, 40 Gbit/s feed forward equalizer (FFE) and decision feedback equalizer (DFE), and 10 Gbit/s maximum likelihood sequence estimation (MLSE) have been fabricated, for example as shown in U.S. Pat. No. 7,184,478, Popescu et al, or a paper published by M. Nakamura, K. Murata, and M. Tokumitsu, "Advances in 40 G electronic equalizers", *Proc. Optical Fiber Communication Conference* (OFC) 2007, paper OThN6, or a paper published by H. Jiang, and R. Saunders, "Advances in SiGe ICs for 40 Gb/s signal equalizers", *Proc. Optical Fiber Communication Conference* (OFC) 2006, paper OTuE1, or a paper published by A. Farbert, S. Langenbach, N. Stojanovic, C. Dorschky, T. Kupfer, C. Schulien, J.-P. Elbers, H. Wernz, H. Griesser, and C. Glingener, "Performance of a 10.7 Gb/s receiver with digital equaliser using maximum likelihood sequence estimation", *European Conference on Optical Communication* (ECOC), Post-deadline Th4.1.5, 2004.

However, these conventional EDCs are based on direct detection (DD EDC) and their performance is limited due to loss of the signal phase information. In addition, the transformation of linear optical impairments into nonlinear impairments after square-law detection significantly increases the operational complexity of the DD EDC. For example, DD MLSE, regarded as an optimized DD EDC as shown in FIG. 2, can extend the transmission reach to ~200 km at 4 states. It has been theoretically predicted that it can achieve 700 km SMF transmission but at the problem of increased electronic processing complexity requiring 8192 Viterbi processor states, as disclosed in a published paper by G. Bosco and P. Poggiolini, "Long-distance effectiveness of MLSE IMDD receivers", *IEEE Photo. Technol. Lett.* 18, 1037-1039 (2006).

EDC based on coherent detection can access both the intensity and the phase, thus exhibiting better performance compared to DD EDC, as shown in U.S. Pat. No. 7,266,310, Savory et al and a paper published by M. G. Taylor, "Coherent detection for optical communications using digital signal processing", in *Proc. Optical Fiber Communication Conference* (OFC) 2007, paper OMP1. However, these systems require a complicated optical implementation due to phase and polarization tracking between the local oscillator and the signal, as shown in FIG. 3.

Recently, a novel cost-effective EDC receiver was proposed, which accesses the intensity and instantaneous frequency information simultaneously, using a single asymmetric Mach-Zehnder interferometer (AMZI). The overall idea was covered by the previous PCT Patent Publication number WO2006131904, assigned to the assignee of the present invention, as shown in FIG. 4 and FIG. 5. Compared to DD EDC where only optical intensity information is available, this method exhibits better compensation performance due to the recovered phase information. It also features better cost effectiveness compared to coherent detection based EDC by avoiding complicated polarization and phase tracking.

However, the two-input one-output electrical signal processing module is required. It is clear that proper design of the electrical signal processing module for impairment compensation is essential to take full use of the extracted optical information.

Previously, the recovered intensity and instantaneous frequency information was used to reconstruct the full optical field, which allows for full-field CD compensation in the electrical domain using a fixed dispersive transmission line, as shown in FIG. 6. Owing to the benefits from the recovery of the knowledge of phase information, full-field EDC using a dispersive transmission line was experimentally demonstrated to recover a 10 Gbit/s OOK signal after transmission through a 500 km of BT Ireland's field-installed SMF between Tyndall National Institute, Cork City, Ireland and Clonakilty, Co. Cork, Ireland without using either in-line compensation or coherent detection, as disclosed in a paper J. Zhao, M. E. McCarthy, P. Gunning, A. D. Ellis, "Mitigation of pattern sensitivity in full-field electronic dispersion compensation", *IEEE Photo. Technol. Lett.,* 21, 48-50, 2009. FIG. 6 shows the experimental setup of technology demonstration. For commercial applications, the real-time oscilloscope can be replaced by ADCs while the signal processing module described in the dotted box is implemented using analogue devices or digital devices such as application specific integrated circuit (ASIC) or field programmable gate array (FPGA). Note that in this technique (FIG. 6), the local oscillator is employed to re-construct the full field in the electrical domain after the optical signals have been optically processed by asymmetric Mach-Zehnder interferometer and optical-to-electrical converted by photodiodes. This is evidently different from the local oscillator used in FIG. 3 which is a narrow-linewidth laser and is used for detecting the optical signals. Electrical oscillator features cost-effective, well-designed specifications, and easily-controlled phase when compared to an optical laser.

Although the dispersive transmission line method is cost effective, a problem is that it has to be matched to particular CD encountered in the transmission and is inflexible for adaptive CD compensation in transparent optical networks. If the transmission paths change because of path re-routing or a path failure, a different dispersive transmission line must be used. Furthermore, dispersive transmission line has no capability for compensation of PMD, which would dynamically change and play an important role for transmission beyond 500 km. As a result, dispersive transmission line may not extend the transmission reach to thousand kilometers even when CD can be fully compensated. In addition, dispersive transmission line cannot mitigate the impairment arising from filtering at the transmitter, add- and drop-nodes, and receiver, e.g. narrow-band filtering by means of WDM multiplexers and de-multiplexers. Narrow band filtering is essential in wavelength-division multiplexed (WDM) optical transmission systems to avoid WDM crosstalk and achieve high spectral efficiency. In addition, the performance of the dispersive transmission line is sensitive to non-optimized system parameters and a large penalty would be induced when the system parameters are not ideal (that is applicable for practical systems). Our recent experiment shows that this method cannot be used to extend the transmission reach beyond 500 km unless system devices with very tight specifications are used. Furthermore, in digitally implemented dispersive transmission line, higher sampling rate analogue-to-digital converters with 4 or more samples per symbol should be used to avoid large performance penalty, which inevitably weakens the advantage of cost-effectiveness of this method. Finally, the dispersive transmission line method lacks automatic optimization capability for system parameters or the ability to equalize the impairments arising from improper setting of these parameters. For example, in the previous experiments, the scaling factor for compensating gain imbalance between the detected two signals, the bias added to the intensity, sampling phase etc were manually optimized, which was time consuming and non-optimal. Since some of these parameters vary as time (e.g. sampling phase) and some are changed when the CD value changes or the path is re-routed (e.g. scaling factor), self-adaptive optimization for these parameters is highly desirable.

Other methods have been proposed to enable adaptive dispersion compensation, as disclosed in J. Zhao et al "Chromatic dispersion compensation using full optical-field maximum likelihood sequence estimation", *Optical Fiber Communication Conference* OThE6, 2009, and US patent publication number US2006/013597A1 D. E. Crivelli et al "Compensating impairments of optical channel using adaptive equalization". The technique disclosed in US2006/013597A1 employs an adaptive equalizer following an optical receiver front end. The optical receiver front end uses an optical local oscillator (laser), or coherent detection as discussed previously, to detect the signals. Coherent detection is different from the direct-detection based full-field detection. It does not need full-field reconstruction circuit in the electrical domain, but requires much higher implementation complexity in the optical domain, including narrow-linewidth optical laser, 90 degree hybrid etc, and additional polarization and phase stabilization. The method disclosed in J. Zhao et al, "Chromatic dispersion compensation using full optical-field maximum likelihood sequence estimation" also enables adaptive dispersion compensation by employing direct-detection based full-field detection. However, this method has limited capability for long-distance transmission as the complexity of the maximum likelihood sequence estimation (MLSE) increases exponentially with the compensated dispersion value. For example, the method requires four Viterbi processor states to achieve 372 km transmission, sixteen Viterbi states for 500 km, and impractically more than one hundred Viterbi states for 700 km at 10 Gbit/s. Consequently, most of the commercial adaptive electronic compensation products (direct-detection based products, and no full-field detection based products to the best of our knowledge) only have the compensation capability of less than 300 km at 10 Gbit/s. In addition, the performance of maximum likelihood sequence estimation is optimal only when the noise statistics of samples into the MLSE is uncorrelated, or whitened, which, however, is not true for practical optical front end. Finally, in addition to the exponentially increasing complexity of the equalization processor, a fast-adaptive MLSE also requires an adaptive algorithm and associated channel estimation circuit. This algorithm and circuit significantly increase additional implementation complexity, which also exponentially increases with the intersymbol-interference spans. A large-state MLSE also requires a longer self-adaptive time to track the changes in the network configurations and consequently degrades the performance for fast adaptation. For example, it would require a much longer training sequence to acquire the channel estimation for a 100-state maximum likelihood sequence estimation than that using only 4 states.

In addition to the complexity and degraded adaptation speed of MLSE for long-distance transmissions, the technique is usually implemented in the digital domain and it is essential to synchronize the symbol rate of the transmitted signal and the rate of the sampled digital signal. However, if the signal is highly distorted, e.g. after 500 km transmission without dispersion compensation, the eye has been completely closed and timing recovery is difficult.

Presently, there is no technical solution to solve all the above mentioned problems. For example, realizing an ideal optical front-end for optimal operation condition of full-field MLSE, and using full-field MLSE for a longer-distance transmission are impractical due to exponentially increase complexity. A MLSE for long-distance transmission also has a degraded adaptation speed accordingly and increases the difficulty for symbol synchronization. Dispersive transmission line has a poorer tolerance and large penalty to non-optimized system parameters. It can also not be used to extend the transmission reach beyond 500 km at 10 Gbit/s unless system devices with very tight specifications are used. Higher sampling rate is required in digitally implemented dispersive transmission line to avoid large performance penalty inevitably increases the implementation complexity, destroying the advantages of cost-effectiveness of the dispersive transmission line method. Dispersive transmission line also lacks adaptive compensation capability.

The optimal design of a practical EDC system require not only the understanding of the features of the methods in terms of their operation complexity and performance conditions, but also how their advantages can be complementary each other such that their performance drawbacks can be overcome to achieve an optimal solution for applications while the operation complexities are not simply increased on a add basis. For example, the required sampling rate of digitally implemented dispersive transmission line can be reduced at a tolerable penalty and its performance sensitivity to non-optimized system parameters can be reduced, when combined with a certain method. Full-field MLSE can approach the optimal condition, increase the adaptation speed, and reduce the complexity under the help of a certain method to whiten the noise and reduce the required state number.

An optimal design also requires the identification of features in practical applications. The impairments such as polarization mode dispersion can change quickly with time (μs), but this impairment usually has a short inter-symbol interference span. The non-ideal impulse responses from for example optical and electrical filtering at the transmitter or receiver would break the optimal operation conditions of the MLSE but they are usually static or slow-varying (e.g. in a scale of s). Chromatic dispersion can change quickly in dynamic packet-switched optical networks (μs), but it usually has a dispersion range, e.g. 1000 ps/nm-2000 ps/nm, in which the adaptive compensation range is 1000 ps/nm. Adaptive compensation of all inter-symbol interference spans using an adaptive equalizer regardless of the static or adaptive feature of the impairment sources, will not only result in non-optimized performance as discussed previously, but also increase the complexity of the equalization processor and adaptive algorithm for channel estimation. Simply trying to use an adaptive equalizer for all intersymbol interference spans also requires a longer training sequence and reduces the adaptation speed.

There is therefore a need to provide a system and method for overcoming the above mentioned problems.

SUMMARY OF THE INVENTION

According to the present invention there is provided, as set out in the appended claims, a for an optical communication network to compensate impairments in the network, using electronic dispersion compensation, said system comprising:
optical means and two or more optical-to-electrical converters for generating at least two electrical signals, comprising amplitude and instantaneous frequency of a received distorted optical signal, and an electrical circuit adapted to perform a full-field reconstruction of the received distorted optical signal using said electrical signals; characterised by:
a dispersive transmission line circuit with compensation parameters updated at a selected rate to process said full-field reconstructed signal and compensate for coarse chromatic dispersion; and
an adaptive electronic equalization circuit with compensation parameters updated at a rate faster than those in the said dispersive transmission line circuit to provide a fine impairment compensation of said reconstructed signals.

The present invention accesses the intensity and the instantaneous frequency of the optical field using a single asymmetric Mach-Zehnder interferometer in direct-detection optical systems. This information is used to reconstruct the full optical field. The parameters in the full-field reconstruction are self-adaptively optimized or controlled by using the feedback signals from the following fast-adaptive circuit to achieve optimal performance (on a slow basis). The invention also provides the circuit implementation of field calculation and phase estimation in a way for easy implementation and optimum performance. The recovered optical field allows full-field CD compensation by using a fixed, but cost-effective, dispersive transmission line to compensate the CD coarsely.

Following the coarse compensation the fast-adaptive full-field EDC is self-adaptively tuned to perform the fine-trimming of CD and other impairments, e.g. dynamically changed PMD, narrowband filtering, varied sampling phase etc. This structure is effective due to the fact that most ISI in the transmission arises from CD that has prior known channel characteristics $\exp(-j\beta_2\omega^2 L/2)$ and is relatively static compared to for example PMD (except the cases of path re-routing). On the other hand, PMD and sampling phase are dynamically changed, and the characteristics of filtering in the channel and gain imbalance between the two detected paths are usually unknown (also depending on path re-routing), but cause ISI with memory length much less than that of CD. As a result, the required memory length or the complexity of the fast-adaptive EDC can be greatly reduced. Due to the different dynamic features of the impairments, it is not optimal to use a single fast-adaptive equalizer to compensate all inter-symbol interference spans regardless of the static or adaptive feature of the impairment sources. The complexity of a fast-adaptive equalizer and the time used for adaptation increases significantly with the inter-symbol interference spans. The separation of the coarse dispersion compensator and fast-adaptive equalizer enables the coarse dispersion compensator to use the means that is simple to implement without complicated fast-adaptive algorithm, and on the other hand, reduces the memory length of the fast-adaptive equalizer and the associated complexity for the equalization processor and fast-adaptive algorithm, and adaptation time. For example, analogue dispersive transmission line or its digitally implementation version, frequency domain equalization, has a poorer adaptation capability but has much less implementation complexity for long-distance transmissions. The use of these methods to remove the intersymbol interference spans arising from static distortions or average chromatic dispersion may reduce the following MLSE states from hundreds or thousands to less than 10. The greatly reduced MLSE state number also, in turn, significantly increases the adaptation speed of MLSE. In addition, the proper combination can overcome the performance drawback of using each circuit alone. For example, the optimal operation of maximum likelihood sequence estimation requires the whitened noise statistics, which however can not be achieved by practical optical front end. This non-optimal condition is static (determined by the receiver front end), so can be solved by the fixed or slow-adjusted compensation circuit. The use of dispersive transmission line alone is sensitive to non-optimized system parameters, and requires a high sampling rate to avoid large performance penalty, which however, can be solved by combining with a fast-adaptive equalizer. In this way, the specifications of the system components can be greatly relaxed and the complexity of the dispersive transmission line is reduced when compared to the case of working alone. This, in practice, can avoid the use of complicated interleaved analogue-to-digital converters because to the best of our knowledge, the real-time state-of-the-art analogue to digital converter only has the sampling rate below 30 Gsamples/s. Separation of static and average impairment compensation and fast-adaptive compensation also facilitates the timing recovery. The dispersive transmission line can be implemented by analogue devices or digitally by frequency domain equalization. These techniques do not require analogue-to-digital converter or is not sensitive to the non-synchronized sampling rate. On the other hand, the fast-adaptive equalizer is usually implemented in the digital domain, e.g. MLSE and FFE, in which the synchronization of the symbol rate of the transmitted signal and the rate of the sampled digital signal is required. In highly distorted signal (e.g. after 500 km transmission without dispersion compensation), the eye is completely closed and timing recovery is difficult, including degraded performance, slow recovery time etc. Coarse compensation of the average dispersion and other additional static impairments will greatly reduce the distortion, and consequently relax the strict requirement for the timing recovery, especially after long distance transmissions. The proposed system and method of the invention can therefore achieve low-cost long-distance transmission up to 2000 km while maintaining the fast-adaptive compensation capability and provide a method for transparent long-haul and metro optical networks.

In one embodiment the asymmetric Mach-Zehnder interferometer comprises a differential phase and adapted to be controlled by a signal generated by said full-field reconstruction circuit or said adaptive electronic compensation circuit.

In one embodiment, said full-field reconstruction circuit comprises means for generating at least one signal related to differential phase misalignment of said asymmetric Mach-Zehnder interferometer, wherein said generated signal is adapted to be used for compensating the differential phase misalignment and/or feeding back to control the phase of said asymmetric Mach-Zehnder interferometer to an optimal value.

In one embodiment an adaptive algorithm module provides means to control the phase in said at least one asymmetric Mach-Zehnder interferometer to an optimal value, or compensate for the phase misalignment of said at least one asymmetric Mach-Zehnder interferometer after optical-to-electrical conversion.

In one embodiment the system provides a circuit to provide full optical-field reconstruction with adaptively controlled or compensated parameters.

In one embodiment the invention provides means for using a dispersive transmission line in direct-detection optical systems to provide the coarse CD compensation of said signals. It will be appreciated that this can be implemented using analogue devices or digital devices. Note that the dispersive transmission line may also have a certain limited tuning capability provided that there is rough information about the CD value. For example, several analogue dispersive transmission lines with different dispersion values (e.g. values for CD of 500 km, 1000 km, and 1500 km SMF) can be placed in parallel, and a switch is used to select the most suitable one (e.g. dispersive transmission line with dispersion value equal to CD of 1000 km SMF) is selected if the estimated fiber length is 850 km. It may also be implemented using fast Fourier transform or a filter with the transfer function of $\exp(j\beta_2\omega^2 L/2)$, where $\beta_2 L$ is the approximated dispersion value. The dispersion value may be estimated using prior knowledge or by an additional CD monitor module. Note that dispersive transmission line has a fixed transfer function of $\exp(j,\beta_2\omega^2 L/2)$ with $\beta_2 L$ roughly estimated by the prior information, so it does not need complicated adaptive algorithm for channel estimation. The system can also receive a feedback signal from the fast-adaptive circuit to adjust the compensation parameters on a slow basis to achieve an optimal static operation condition. This includes the whitening the noise to enable an optimal condition for the late-stage fast-adaptive circuit, and compensation of static distortions such as the distortions at the transmitter and receiver.

In one embodiment the fast-adaptive full-field EDC is self-adaptively tuned out to perform fine-trimming of CD and other transmission impairments in said signals. Fast-adaptive full-field EDC can be full-field MLSE or full-field FFE/DFE, and would exhibit better compensation performance compared to conventional DD EDC due to the recovered phase information. Adaptive full-field EDC is not limited to a specific impairment (e.g. CD with the fixed transfer function of $\exp(-j, \beta_2\omega^2 L/2)$), and can compensate impairments regardless of their sources without prior-known channel characteristics by using fast-adaptive algorithms. Therefore, it can compensate finely not only residual CD, but also PMD, narrowband filtering and impairments arising from non-optimal system parameters including sampling phase misalignment. It can also provide feedback signals to the said coarse dispersion compensator and field-reconstruction circuit to optimize the slow-varied parameters such as gain imbalance etc. Its complexity can be significantly relaxed due to reduced ISI memory length by the dispersive transmission line.

In one embodiment, the invention provides an adaptive algorithm to control the system parameter to compensate the gain imbalance between the intensity and the instantaneous frequency paths. Equivalently, the algorithm can be incorporated in the adaptive full-field EDC such that this impairment can be equalized in the adaptive EDC, instead of been mitigated by controlling the system parameter using the feedback information from the adaptive EDC. Note that this adaptive algorithm does not have to be fast-adaptive due to the slow-varying feature of the gain imbalance, no matter if it is implemented in the fast-adaptive circuit or by fed a signal from the fast-adaptive circuit into the reconstruction circuit for automatic control.

In one embodiment, the hybrid full-field EDC is much more robust to the misalignment of the sampling phase compared to the dispersive transmission line method. In practice, especially for long-distance transmission, the sampling rate of the ADCs (usually obtained from clock recovery) cannot perfectly synchronize the data rate of the transmitted signal. As a result, the sampling phase may vary as time and would not be always at the centre of the eye diagram. Hybrid full-field EDC is promising to enhance the tolerance to such sampling phase drifting and greatly relax the requirement for the ADCs and clock recovery.

In one embodiment, the hybrid full-field EDC based on adaptive FFE using the LMS algorithm requires a self-tuned bias parameter to improve the performance and adaptive capability.

In one embodiment the invention provides means for using a low-pass or band-pass filter with a transfer function of $H(\omega)\sim 1/(j\omega)$ for large $\omega$ (>several GHz) to reconstruct the optical phase. Generally, a band-pass filter with $H(\omega)\sim 0$ for $\omega=0$ would perform better than a low-pass filter. Phase estimation can also be achieved by cascading a high-pass filter and an integrator. In the version of analogue implementation, phase estimation is achieved by a low-pass/band-pass filter plus a phase modulator, or a high-pass filter plus a frequency modulator. The transfer function of the filter should be optimized to achieve high-quality phase reconstruction and improve the performance of said signals. One example of the low-pass filter is $1^{st}$ order RC circuit of $1/(1+j\omega RC)$.

In one embodiment, the hybrid full-field EDC, in a digital implementation, comprises an implementation of field calculation using multipliers.

In one embodiment the impairments comprise one or more of the following transmission impairments: chromatic dispersion (CD), polarization mode dispersion (PMD), and filtering effects in the channel.

In one embodiment the optical network transmits 10 Gbit/s OOK signal greater than distance of 500 km.

In one embodiment the intensity and instantaneous frequency of the distorted signal are detected by a direct detector and a balanced detector to provide said two detected signals, or by a two single detectors with additional signal processing to extract the intensity and instantaneous frequency.

In one embodiment, the misalignment of the AMZI phase can be compensated by an adaptive algorithm. Alternatively, the adaptive algorithm can generate a feedback signal to control the AMZI directly for phase optimization. The adaptive algorithm is implemented in field reconstruction circuit. It does not have to be fast-adaptive due to the slow-varying feature of the phase misalignment arising from the temperature and/or wavelength drifting.

It will be appreciated the present invention basically provides an architecture and method to compensate system impairments, including CD, PMD, filtering in optical networks, and sampling phase misalignment, using a hybrid full-field EDC comprising a cost-effective dispersive transmission line and a fast-adaptive full-field EDC. It also provides adaptive algorithms for automatic optimization of the system parameters or equalization of the impairments arising from improper setting of these parameters, including scaling factor and AMZI phase. The present invention also provides the circuit implementation of field calculation and phase estimation in a way of easy implementation and optimum performance. The present invention can not only significantly enhance the transmission reach at low cost but also handle the frequently changed or unknown system impairments, for example varied residual CD arising from change of transmission paths in MANs, PMD which can dynamically change as time in a scale of ms, gain imbalance between the intensity and instantaneous frequency paths that depends on path rerouting, varied sampling phase that is severe especially for long-distance transmission, AMZI phase misalignment varying as temperature changes, and narrowband filtering to increase the spectral efficiency in the optical network.

Electrical signal processing for impairment compensation in optical communication systems has attracted much interest recently due to advance of high-speed IC processor, e.g. 30~56 Gsamples/s ADCs, extendable to higher sampling rate in interleaving mode. Compared to commercial DCF in the existing optical networks, EDC is flexible, cost-effective, and easy for integration in transmitters or receivers.

Full-field EDC features better compensation performance compared to conventional DD EDC as it benefits from the knowledge of the recovered phase information, and also better cost effectiveness compared to the coherent-detection based EDC by avoiding complicated phase and polarization tracking or recovery.

Full-field EDC using a dispersive transmission line has been demonstrated to achieve 500 km BT Ireland's field-installed SMF transmission without any in-line optical dispersion compensation. However, dispersive transmission line has to be matched to particular CD encountered in the transmission and is inflexible for adaptive CD compensation. Furthermore, dispersive transmission line fails to compensate other impairments such as varied PMD, and lacks the adaptive capability for system optimization. On the other hand, fast-adaptive equalizer is impractical for long-transmission distance. For example, maximum likelihood sequence estimation requires 4 Viterbi processor states for compensating 372 km, 16 states for 500 km and impractically more than 100 states for 700 km. The adaptive algorithm for channel estimation further increases the implementation complexity, and its complexity and adaptation performance are dependent on the inter-symbol interference spans. Hybrid full-field EDC employs a cost-effective dispersive transmission line followed by a fast-adaptive full-field EDC. The dispersive transmission line can achieve cost-effective long-distance CD compensation without the need for complicated algorithms using the system and method of the present invention. By using the solution of the invention to compensate static distortions and average chromatic dispersion to significantly reduce the intersymbol interference spans, the complexity and the adaptation speed of the fast-adaptive circuit can be greatly improved. The use of a static compensation circuit before fast-adaptive maximum likelihood sequence estimation can also whiten the noise to enable the optimal operation condition of the following fast-adaptive equalizer.

In the context of utilising the present invention fast-adaptive full-field EDC can further improve the performance and significantly enhance the residual CD tolerance range. Furthermore, fast-adaptive full-field EDC compensate ISI regardless of its sources using adaptive algorithms, and so can also compensate other impairments such as PMD (prominent for distance beyond 500 km) and ISI from narrow-band filtering to enable cost-effective, long-distance and flexible optical transmissions. The fast-adaptive algorithm can also adaptively control the system parameters to facilitate the system optimization, such as the optimization of the scaling factor to compensate the gain imbalance between the received intensity and instantaneous frequency paths. The fast-adaptive EDC can also increase the robustness of the system to the misalignment of the sampling phase. The complexity of fast-adaptive full-field EDC is related to the memory length of the channel and has been greatly reduced by the dispersive transmission line.

In another embodiment there is provided a method for compensating impairments in an optical communication network, using electronic dispersion compensation (EDC), comprising the steps of:

receiving two signals, representing amplitude and instantaneous frequency, and performing a full-field reconstruction of said signals;

providing a coarse CD compensation of said reconstructed signals using a dispersive transmission line circuit; and providing a fine impairment compensation of said reconstructed signals, using an EDC circuit and adaptively optimize system parameters.

A communication system comprising:

means for receiving two signals, depending on amplitude and instantaneous frequency, and performing a full-field reconstruction of said signals; and an electronic circuit to provide impairment compensation of said reconstructed signals.

In one embodiment the communication system comprises an adaptive algorithm module to provide a control or compensation for any phase misalignment of an AMZI, where the AMZI generates the instantaneous frequency.

In one embodiment the communication system comprises calculation means to provide a full-field reconstruction of said instantaneous frequency signal and said amplitude signal using filtering means and multiplication means.

In one embodiment the communication system comprises an adaptive algorithm module provides control or compensation for gain imbalance between the two signals.

In another embodiment there is provided a system, for an optical communication network to compensate impairments in the network comprising:

optical means and two or more optical-to-electrical converters for generating at least two electrical signals, comprising the amplitude and instantaneous frequency of a received distorted optical signal;

means for deriving the amplitude and instantaneous frequency of the distorted optical signal using the said received electrical signals from the optical-to-electrical converters;

means for processing the amplitude and instantaneous frequency signals to generate the full field using filter means and multiplication means; and an electrical circuit to compensate impairments in said reconstructed signals.

In another embodiment there is provided a system, for an optical communication network to compensate impairments in the network comprising:

optical means and two or more optical-to-electrical converters for generating at least two electrical signals, comprising the amplitude and instantaneous frequency of a received distorted optical signal;

an electrical circuit adapted to perform a full-field reconstruction using said signals;

means for compensating impairments in said reconstructed signals; and means to adaptively equalize the gain imbalance between the electrical outputs of the optical-to-electrical converters in the said electrical circuit.

In another embodiment there is provided a system, for an optical communication network to compensate impairments in the network comprising:

at least one asymmetric Mach-Zehnder interferometer, and two or more optical-to-electrical converters for generating at least two electrical signals, comprising the amplitude and instantaneous frequency of a distorted optical signal;

an electrical circuit adapted to perform a full-field reconstruction using said signals; and means for compensating impairments, for example chromatic dispersion, in said reconstructed signals; and means for adaptively generating at least one parameter or signal that is related to the differential phase misalignment of the asymmetric Mach-Zehnder interferometer in the said electrical circuit.

In a further embodiment there is provided a method for an optical communication network to compensate impairments in the network, using electronic dispersion compensation, said method comprising:

generating at least two electrical signals, comprising amplitude and instantaneous frequency of a received distorted optical signal, and an electrical circuit adapted to perform a full-field reconstruction of the received distorted optical signal using said electrical signals; characterised by:

updating compensation parameters in a dispersive transmission line circuit updated at a selected rate to process said full-field reconstructed signal and compensate for coarse chromatic dispersion; and updating compensation parameters in an adaptive electronic equalization circuit updated at a rate faster than those in the said dispersive transmission line circuit to provide a fine impairment compensation of said reconstructed signals.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 7:
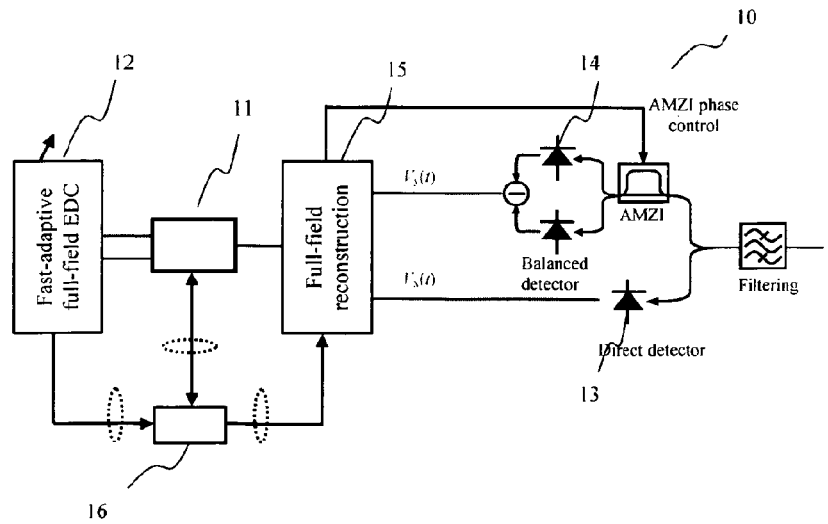
FIG. 7 illustrates an embodiment of the system according to a first aspect of the invention.

Referring now to the drawings, FIG. 7 illustrates a hybrid full-field EDC technique, indicated generally by the reference numeral 10, comprising a cost-effective dispersive transmission line 11 for coarse impairment compensation and fast-adaptive full-field EDC 12 for fine-trimming of the impairments, according to the invention, the operation of which is described in more detail below.

Figure 1:
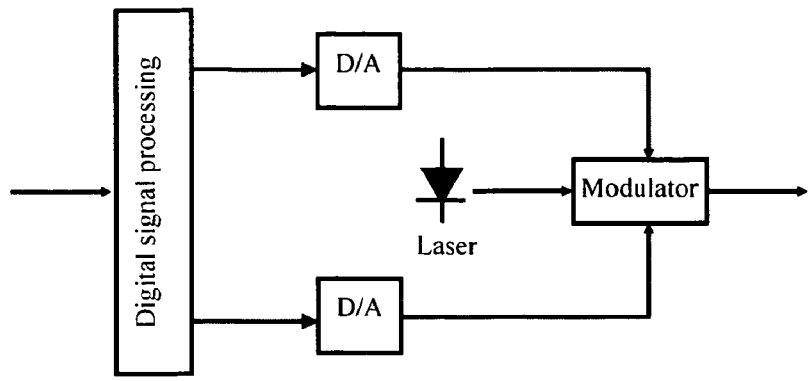
FIG. 1 illustrates a prior art system for a transmitter-side EDC.
Figure 2:
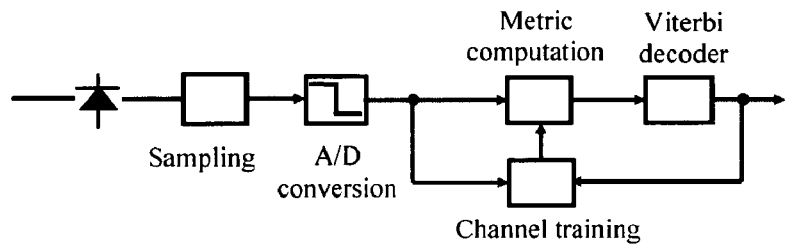
FIG. 2 illustrates a prior art system for a DD MLSE system.
Figure 3:
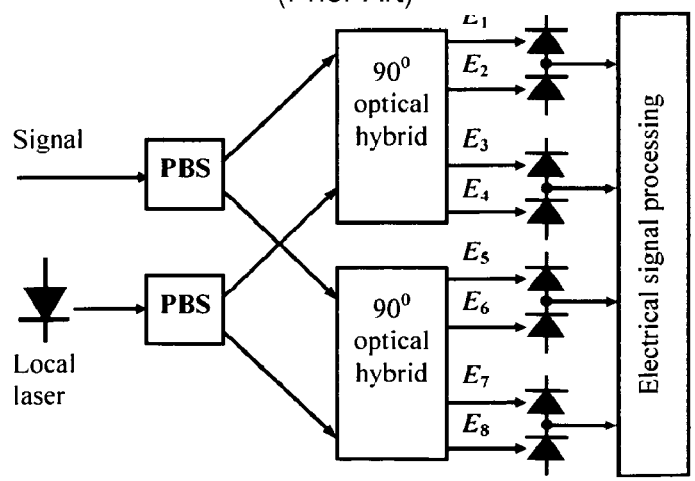
FIG. 3 illustrates a prior art system for coherent detection EDC.
Figure 4:
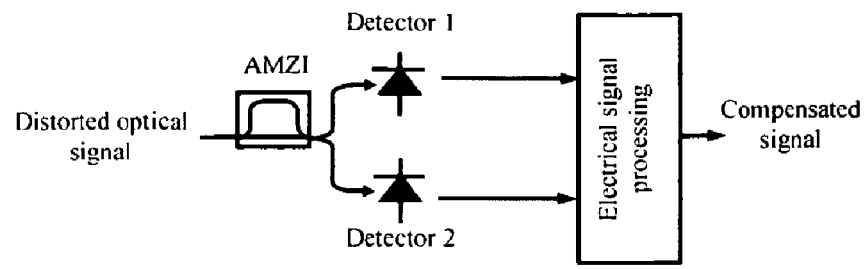
FIG. 4 illustrates a prior art implementation of a full-field EDC system.

At a receiver, the intensity and instantaneous frequency of a received distorted signal are detected by a direct detector 13 and a balanced detector 14 respectively (or by using the configuration of FIG. 4). The two detected signals (representing intensity and instantaneous frequency) are used by a full optical-field reconstruction module 15. An adaptive controlling algorithm 16 is used in the full-field reconstruction module 15 to optimize the phase of an AMZI. The recovered full optical field is fed into a fixed dispersive transmission line 11, which can roughly compensate CD in the transmission. The two outputs of the dispersive transmission line are then fed into a self-adaptive full-field EDC, which will perform fine-trimming of the residual CD and greatly relax the limitation from PMD. Furthermore, the system can also enable the use of narrowband filtering to increase the spectral efficiency while leaving ISI caused by narrowband filtering to be compensated by the fast-adaptive full-field EDC. The fast adaptive full-field EDC also increases the robustness to the misalignment of the sampling phase and relaxes the requirements of the ADCs and clock recovery in synchronization with the signal data rate. Full-field EDC can also incorporate adaptive algorithms to optimize the system parameters in the full-field reconstruction, as shown in FIG. 7. Note that FIG. 7 illustrates that the adaptive full-field EDC is used to feed back information to the field reconstruction module for parameter controlling. However, it is also possible that imperfect system parameters are not controlled in the full-field reconstruction, with the resultant distortions compensated in the fast-adaptive full-field EDC.

The fast-adaptive full-field EDC can be full-field FFE/DFE, or full-field MLSE. Full-field FFE/DFE and full-field MLSE would exhibit better compensation performance compared to conventional DD FFE/DFE and DD MLSE due to knowledge of phase information. However, their complexity increases dramatically as CD value increases. A static dispersive transmission line can effectively reduce the ISI memory length and therefore the complexity of the fast-adaptive EDC.

Figure 5:
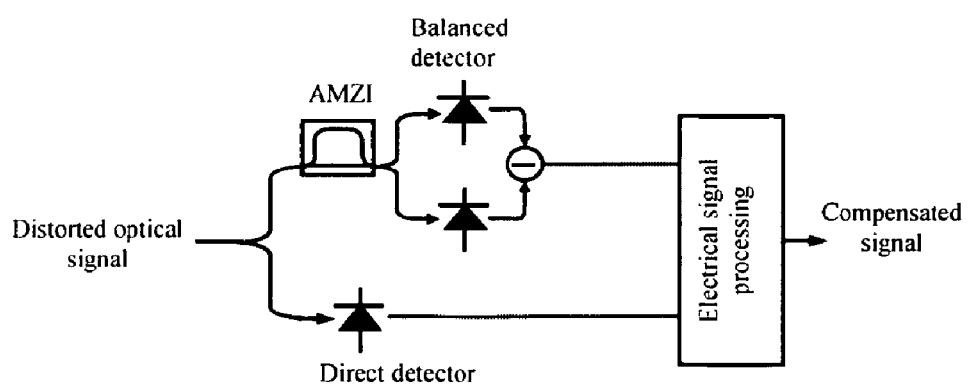
FIG. 5 illustrates another prior art implementation of a full-field EDC system.
Figure 6:
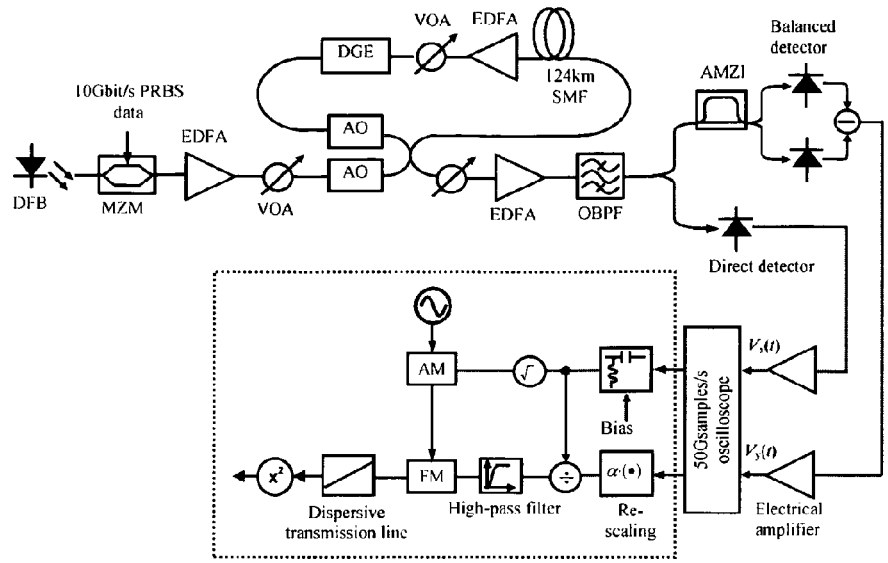
FIG. 6 illustrates a prior art full-field EDC system with a fixed dispersive transmission line.
Figure 8:
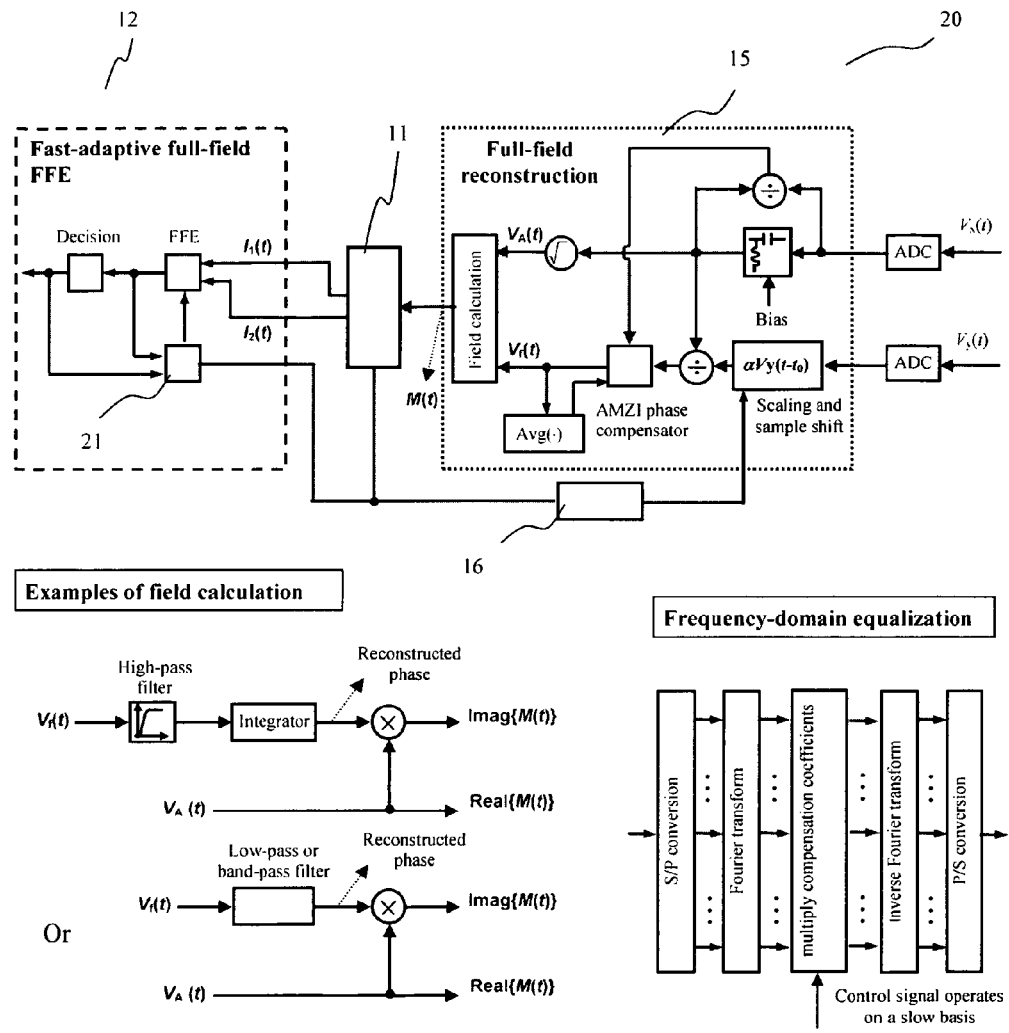
FIG. 8 illustrates an example of hybrid full-field EDC comprising a digitally implemented dispersive transmission line and a fast adaptive FFE according to the present invention.

FIG. 8 shows a detailed implementation of hybrid full-field EDC, indicated generally by the reference numeral 20, comprising a dispersive transmission line 11 and a fast adaptive full-field FFE 12. The optical configuration is based on FIG. 5 (or FIG. 7). Proper modification on the implementation of full-field reconstruction should be applied when the configuration of FIG. 4 is used. An example of the low-pass filter is $1/(1+j\omega RC)$ (corresponding to $1^{st}$ order RC circuit in the analogue version) but not limited to this. It should has the transfer function $\sim 1/(j\omega)$ when $\omega$ is large (>several GHz).

In one embodiment, full-field reconstruction 15, dispersive transmission line 11, and fast-adaptive full-field EDC 12 are all digitally implemented. The sampling rate and the quantization resolution of the ADCs for the $V_x(t)$ and $V_y(t)$ signals are important, the impact of which on the system performance depend on the fiber length. Generally, four or more samples per bit are required to induce negligible performance penalty at 2000 km, which however can be reduced to two samples per bit at a tolerable penalty when combined with a fast-adaptive equalizer as will be shown later. The details with respect to the bias added to the intensity $V_x(t)$, the time shifting, and the scaling factor required to correct for the gain imbalance for the $V_x(t)$ and $V_y(t)$ paths are typically manually tuned, which can be time consuming and non-optimal. Furthermore, these parameters may vary as time or change when the CD value changes or the path is re-routed. In the present invention, the scaling factor is self-controlled to an optimal value by an adaptive algorithm 21. The adaptive algorithm can be incorporated in the fast-adaptive EDC to equalize the distortion arising from the improper setting of the scaling factor. A phase compensator is used to adaptively compensate the differential phase misalignment of the AMZI The phase of the AMZI should be tuned to be exactly $\pi/2$, but in practice it may drift as temperature changes. The AMZI phase misalignment can be estimated by $avg(V_f(t))/avg(V_x(t)/(V_x(t)+bias))$ (where $avg(x)$ is the mean of x) and the distortion of the instantaneous frequency $V_f(t)$ can be alleviated by removing the term that is added to $V_f(t)$ by the AMZI phase misalignment. Note that the phase of AMZI is usually slow-varying so this adaptive mitigation scheme would not increase the complexity significantly. Also note that AMZI phase misalignment can also be compensated by controlling the AMZI directly using the feedback signal generated by the adaptive algorithm, instead of being compensated by an additional phase compensator module, as will be shown in FIG. 15 below.

Reconstruction of the optical phase, $V_p(t)$, is achieved by using a low-pass or band-pass filter with a transfer function of $H(\omega) \sim 1/(j\omega)$ for large $\omega$ (>several GHz). Generally, a band-pass filter with $H(\omega) \sim 0$ for $\omega=0$ would perform better than a low-pass filter. Alternatively, optical phase reconstruction can also be attained by cascading a high-pass filter and an integrator, and in this case, the bandwidth of high-pass filter is required to be optimized to achieve high-quality phase estimation. Note that in this example, full-field reconstruction is digitally implemented.

In an analogue implementation, phase estimation can be implemented by passing $V_f(t)$ through a low-pass or band-pass filter followed by a phase modulator, as will be shown later. The field calculation for the estimation is typically $V_A(t) e^{j\int V_f(t) dt}$, but the present invention utilises the equation:

$$V_A(t)e^{j\int V_f(t)dt} \approx V_A(t)(1+j\int V_f(t)dt - (\int V_f(t)dt)^2/2 \ldots \approx V_A(t)(1+j\int V_f(t)dt)$$

This estimation induces negligible performance penalty while greatly relaxing the implementation complexity, as shown in FIG. 8.

It will be appreciated that in full-field reconstruction, the division may be omitted to reduce the complexity but at the expense of a certain amount of performance degradation. Practical design depends on a balance between performance and cost.

The dispersive transmission line is implemented using FFT or a FIR filter:

$$\psi_L(\omega) = \psi_M(\omega) \cdot \exp(j\beta_2 \omega^2 L)$$

where $\psi_I(\omega)$ and $\psi_M(\omega)$ are the spectra of $I(t)=(I_1(t)+j\cdot I_2(t))$ and $M(t)$ respectively. $\exp(j\beta_2\omega^2 L/2)$ has the inverse transfer function of CD, whose value is preset.

Referring now to the operation of the fine tuning aspect of the invention, full-field FFE is used as an example of the fast-adaptive full-field EDC part. Least mean square algorithm is used for channel estimation in the figure but other algorithms, e.g. RLS, can also be used. Assuming that $a_n$, and $f_n$ being the $n^{th}$ estimated signal data and the FFE coefficients:

$$a_n = \sum_{k=-N}^{N} I_{n-k} f_k + \text{bias}$$

where $f_k$ and bias are adaptively updated using mean square error criteria. $(2N+1)$ is the tap number and equals $(m+1)\times$ Samples per bit, m is the memory length. The adaptive bias greatly influences the adaptive capability and the performance of the hybrid full-field EDC, and is updated by:

$$\text{bias}^k = \text{bias}^{k-1} + \Delta \cdot (b_k - a_k).$$

where $\Delta$ and $b_k$ are the parameter to control the update speed and the $k^{th}$ transmitted logic data respectively.

The misalignment of the sampling phase, $t_0$, can be viewed as a filter with the transfer function of $e^{-j\omega t_0}$, where $t_0$ is unknown and can change as time (in particular, in the case that the sampling rate is not synchronous with the signal data rate). However, fast-adaptive full-field EDC can adaptively compensate such distortion by trimming the transfer function of the FFE.

Fast-adaptive full-field EDC can also incorporate the adaptive algorithm for controlling the scaling factor in full-field reconstruction to compensate the gain imbalance between the two detected signal paths:

$$\alpha^k = \alpha^{k-1} + \Delta \cdot (b_k - a_k) \cdot I_p$$

where $I_p(t)$ is the resultant signal of $j\cdot V_p(t)$ after compensation and has the form in the frequency domain:

$$\psi_{Ip}(\omega) = \psi_{Vp}(\omega) \cdot \exp(j\beta_2\omega^2 L) \cdot F(\omega)$$

where $\psi_{Ip}(\omega)$ and $\psi_{Vp}(\omega)$ are the spectra of $I_p(t)$ and $j\cdot V_p(t)$ respectively. $F(\omega)$ is the transfer function of the fast-adaptive FFE.

Figure 9:
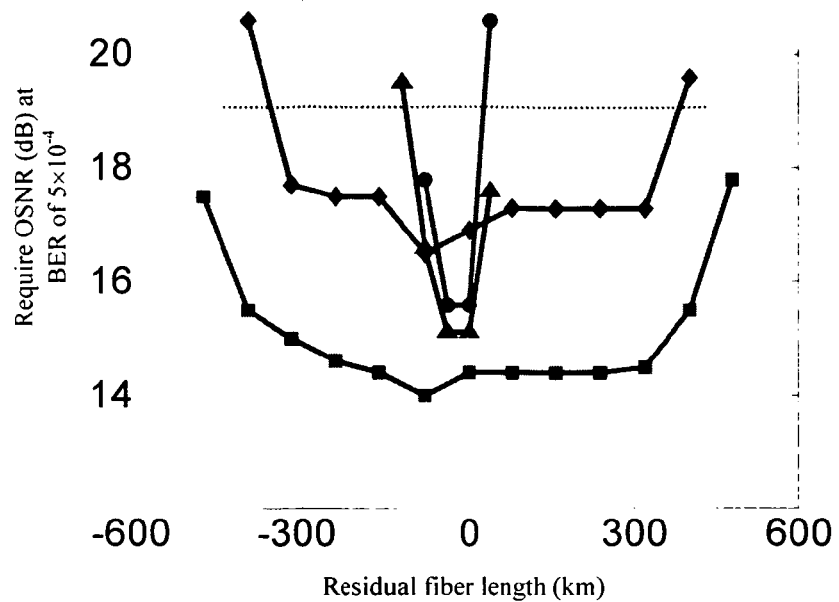
FIG. 9 depicts the performance to achieve BER of $5 \times 10^{-4}$ as a function of residual fiber length at 2000 km.

FIG. 9 shows the performance as a function of residual fiber length at 2000 km by using dispersive transmission line only using 5 samples per bit ADCs (shown as circles), dispersive transmission line plus DD FFE at 5 samples per bit (shown as triangles), dispersive transmission line plus full-field FFE at 5 samples per bit (shown as squares), and dispersive transmission line plus full-field FFE using 2 samples per bit ADCs (shown as diamonds). The dispersive transmission line was set to fully compensate 2000 km CD. Least mean square algorithm was used for adaptive channel estimation. The memory length of fast-adaptive DD FFE and full-field FFE was 4 bits.

The quantization resolution was assumed to be infinity. Thermal noise and fiber nonlinearity were included, and the time delay of the AMZI and the fiber link configuration were optimized to suppress these effects. PMD effect was not included.

FIG. 9 verifies the effectiveness of the full-field EDC for residual impairment compensation. From the figure, it is shown that dispersive transmission line only or dispersive transmission line plus DD FFE exhibited very limited compensation capability for residual CD, with the CD tolerance range of only around 100 km at 18 dB OSNR. By using dispersive transmission line plus full-field FFE (shown as squares), the residual CD tolerance can be greatly increased to approximately from −500 km to 500 km (1500 km-2500 km) at 18 dB OSNR. At zero residual fiber length, around 1.2 dB performance improvement of hybrid full-field EDC compared to the dispersive transmission line only was due to the fact that adaptive full-field FFE can compensate unknown imperfect system response, which, however, cannot be included by the dispersive transmission line. From the figure, it is possible to find that reducing the sampling rate to two samples per bit would introduce around 3 dB performance penalty, so practical implementation depends on the trade-off between the performance and complexity. Note that phase estimation in the figure was implemented by cascading a high-pass filter and an integrator. When a low-pass filter was used for phase reconstruction, the penalty arising from two samples per bit would be reduced to 1.5 dB. Also note that in the full-field FFE, the adaptive bias was incorporated in the LMS algorithm. Otherwise, although not explicitly depicted in the figure, the required OSNR for 0 km residual fiber length using dispersive transmission line plus full-field FFE would be larger than 20 dB.

Figure 10:
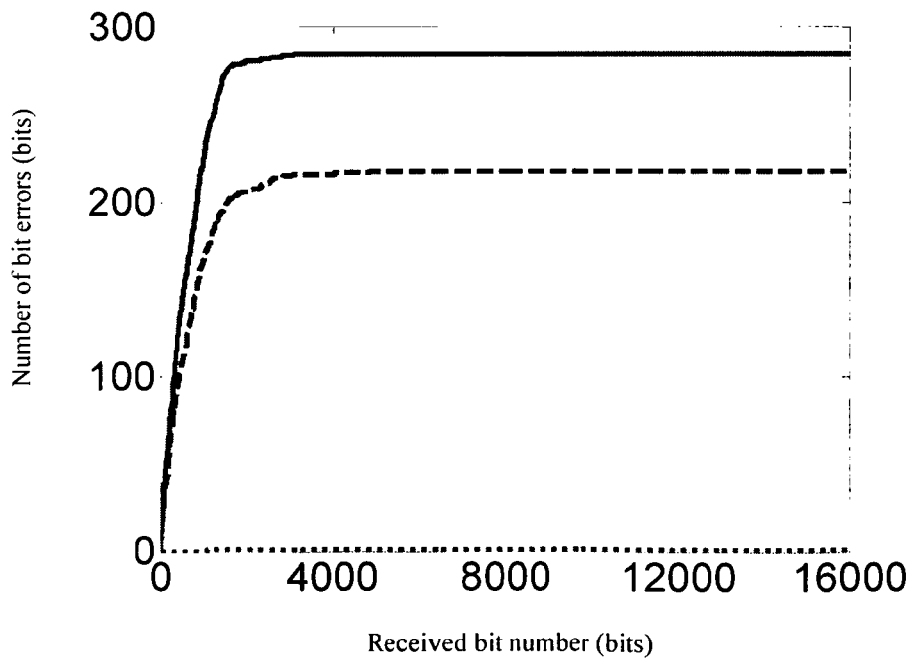
FIG. 10 depicts the number of bit errors as a function of received bit number to illustrate the adaptive compensation of hybrid full-field EDC.

FIG. 10 shows the adaptive capability of the hybrid full-field EDC at 2000 km when the residual fiber length is 400 km (shown as solid), 200 km (shown as dashed) and 0 km (shown as dotted) at 16 dB OSNR. The memory length of adaptive full-field FFE was 4 bits and the dispersive transmission line was set to fully compensate 2000 km CD. It can be seen that even when the preset dispersion value of the dispersive transmission line did not match that of the CD in the fiber link, the residual CD could be adaptively trimmed by the self-adaptive full-field FFE and the bit error rate, after a certain amount of adaptive time, became steady. In this example using full-field FFE with the LMS algorithm, the training bit number was less than 4,000.

Figure 11:
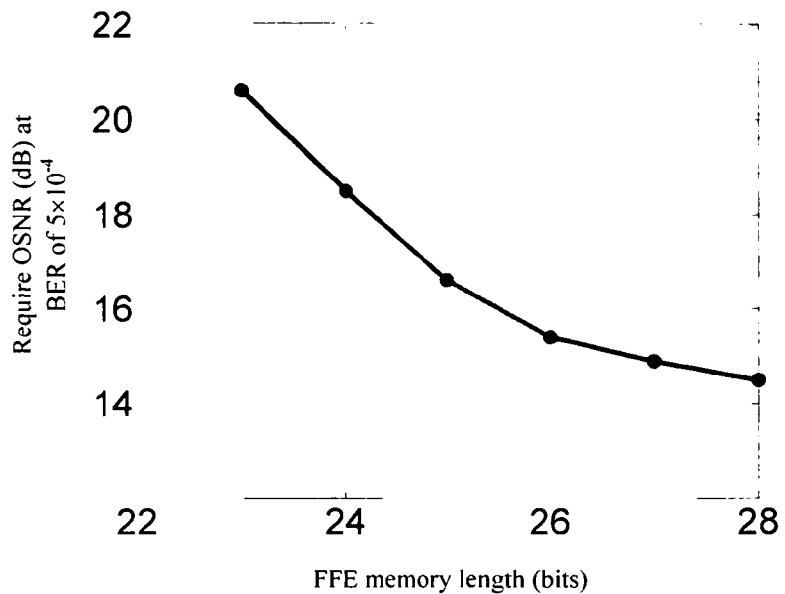
FIG. 11 shows the performance versus memory length of fast-adaptive FFE at 2000 km when only fast-adaptive FFE without a dispersive transmission line was used for impairment compensation.

As discussed above, the fast-adaptive full-field EDC structures would exhibit better performance compared to DD EDC, but also has the complexity increased dramatically as CD. FIG. 11 shows the required OSNR to achieve BER of $5\times10^{-4}$ at 2000 km when only adaptive full-field FFE at 5 samples per bit is used. It can be seen that at least 27-bit memory length (~135 taps) was required to avoid large performance degradation. Such memory length would be increased to around 32 bits if two samples per bit are employed. As a result, the associated adaptive algorithm to implement this FFE would be complicated. A hybrid full-field EDC is essential to achieve low-cost long-distance transmission while maintaining the fast-adaptive compensation capability.

Figure 12:
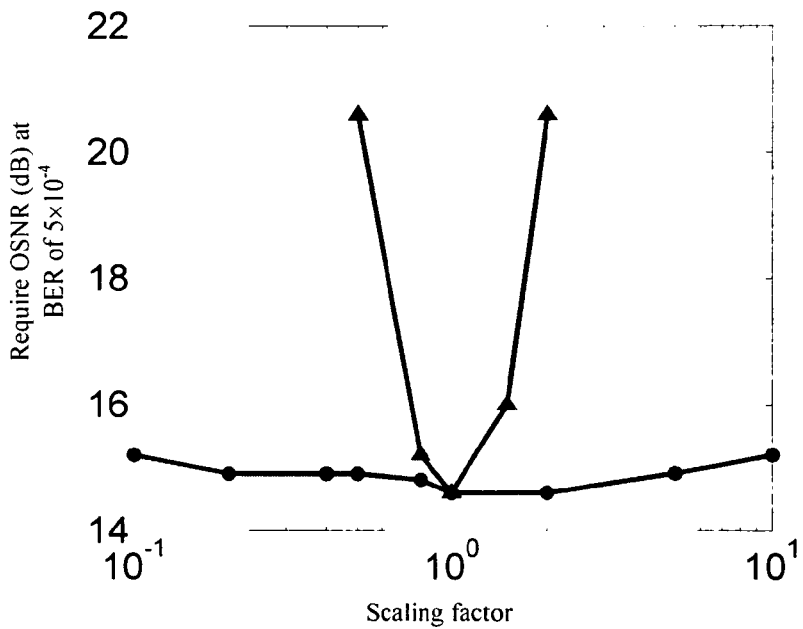
FIG. 12 shows an adaptive algorithm of hybrid full-field EDC to enhance the robustness to the gain imbalance between the intensity and the instantaneous frequency paths.

FIG. 12 depicts the performance of the hybrid full-field EDC as a function of the scaling factor without (shown as triangles) and with (shown as circles) the adaptive algorithm to optimize the scaling factor. In the figure, the scaling factor was normalized, with one representing the balanced gain between the two detected signal paths.

It can be appreciated that the proposed adaptive algorithm could greatly enhance the dynamic range of the scaling factor, and in the range of [0.1 10], the OSNR penalty was less than 1 dB.

Figure 13:
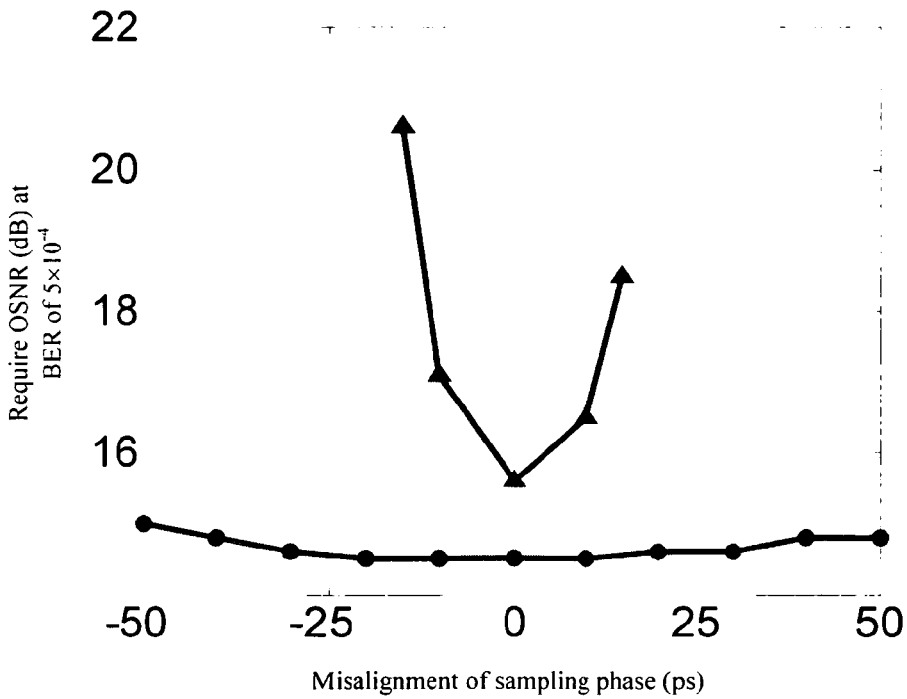
FIG. 13 shows the performance as a function of the misalignment of the sampling phase using dispersive transmission line and hybrid full-field EDC.

FIG. 13 shows the required OSNR versus the misalignment of the sampling phase using dispersive transmission line only (shown as triangles) and hybrid full-field EDC (shown as circles). For conventional dispersive transmission line, the performance was very sensitive to the sampling phase. However, when using hybrid full-field EDC, less than 1 dB penalty was observed for the sampling phase of [−50 ps 50 ps], which would greatly relax the requirement for the sampling rate of the ADCs, clock recovery, etc.

Figure 14:
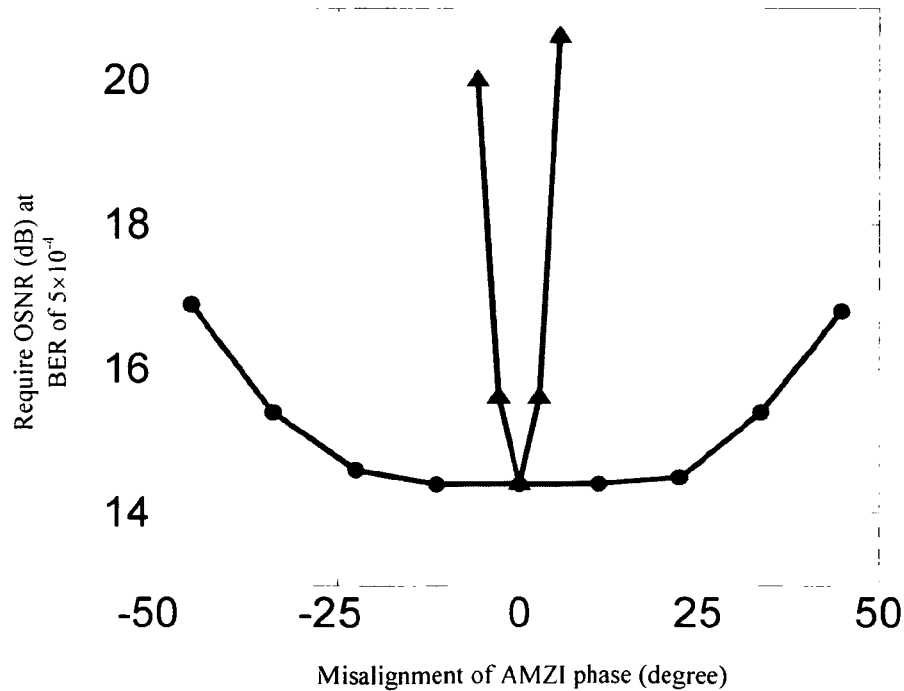
FIG. 14 shows an adaptive algorithm in hybrid full-field EDC to compensate AMZI phase misalignment.

FIG. 14 shows the performance of the proposed adaptive algorithm to compensate the phase misalignment of the AMZI. Circles and triangles represent the cases with and without the compensation algorithm. It can be clearly seen that the algorithm can effectively improve the performance tolerance to the AMZI phase misalignment.

Figure 15:
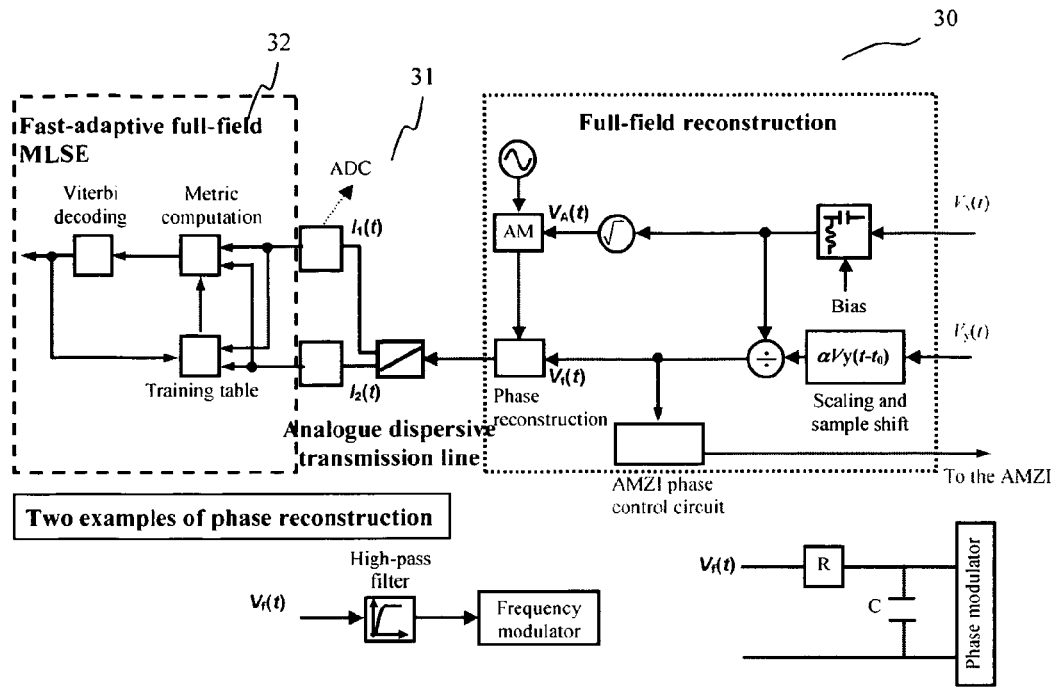
FIG. 15 illustrates another example of hybrid full-field EDC comprising an analogue dispersive transmission line and a full-field MLSE at two samples per bit according to the invention.

FIG. 15 shows another detailed implementation using hybrid full-field EDC, indicated generally by the reference numeral 30, comprising an analogue dispersive transmission line 31 and a digitally implemented full-field MLSE 32 at two samples per bit. In this example, different from that in FIG. 8, the phase misalignment of AMZI is not compensated by an additional compensator, but eliminated by a circuit that feeds the misalignment information back to the AMZI for direct phase control. However, the principle is similar to that in FIG. 8. Optical phase reconstruction may be achieved by feeding the recovered instantaneous frequency into a high-pass filter and then a frequency modulator. It can also be attained by passing $V_f(t)$ through a low-pass or band-pass filter (should satisfy $H(\omega) \sim 1/(j\omega)$ for large $\omega$), e.g. a $1^{st}$ order RC circuit, followed by a phase modulator, where the 3 dB bandwidth of the RC circuit is around 1 GHz (exact value depends on the fiber length and system parameters). Although $1^{st}$ order RC circuit with the transfer function of $1/(1+j\omega RC)$ is shown in the figure, higher order circuit with a transfer function $H(\omega)$ of $H(\omega) \sim 1/(j\omega)$ for large $\omega$ and $H(\omega) \sim 0$ for $\omega=0$, would also work.

The dispersive transmission line has the inverse transfer function of CD, whose value is preset. Full-field MLSE is used as the fast-adaptive full-field EDC part. The outputs ($I_1(t)$ and $I_2(t)$) of the dispersive transmission line may be the real and imaginary parts ($I_{real}(t)$ and $I_{imag}(t)$), amplitude and phase parts ($I_{amp}(t)$ and $I_{phase}(t)$), or other transform of the full field. $I_1(t)$ and $I_2(t)$ are sampled by ADCs with one or two samples per bit (two samples are preferred for better performance). The full-field MLSE, different from DD MLSE, exploits the information of the two inputs simultaneously in both metric computation and channel training. The metric $PM(b_n)$ of full-field MLSE is:

$$PM(b_n) = PM(b_{n-1}) - \sum_i \log(p(I_1(t_i), I_2(t_i) | b_{n-m}, \ldots b_n))$$

where $i \in \{n \; n+\frac{1}{2}\}$ for two samples per bit. $b_n$ and $p(I_1(t_i), I_2(t_i)|b_{n-m}, \ldots, b_n)$ are the $n^{th}$ OOK logical data and the two-dimensional joint probability of the recovered full optical field at time $t_i$ given the logical data $b_{n-m}, \ldots, b_n$, respectively. m is the memory length. The lookup table in full-field MLSE can be established and updated by using nonparametric histogram, parametric method, blind channel estimation etc. In the histogram method, the histogram is built up to numerically estimate $p(I_1(t_i), I_2(t_i)|b_{n-m}, \ldots, b_n)$ for all combinations of $(b_{n-m}, \ldots, b_n)$ and updated by: $p^{(L)}(I_1(t_i), I_2(t_i)|b_{n-m}, \ldots, b_n) = (1-\lambda) \; p^{(L-1)}(I_1(t_i), I_2(t_i) |b_{n-m}, \ldots, b_n) + \lambda q^{(L)}(I_1(t_i), I_2(t_i)|b_{n-m}, \ldots, b_n)$, where $q^{(L)}(I_1(t_i), I_2(t_i) |b_{n-m}, \ldots, b_n)$ is the histogram of the $L^{th}$ block of data, and $\lambda$ is a parameter to control the speed of the update. Note that the histogram method may need a long training sequence. Therefore, the parametric method can be used to setup the lookup table and the histogram method can be used for updating. The probability of $I_1(t_i), I_2(t_i)$ in the system is theoretically estimated, $p(I_1(t_i), I_2(t_i)|b_{n-m}, \ldots, b_n, \alpha_1, \alpha_2 \ldots \alpha_q)$, where $\alpha_1, \alpha_2 \ldots \alpha_q$ are the parameters of the probability (e.g. noise density, second-order moment etc) and determined by the training sequence. Note that $p(I_1(t_i), I_2(t_i)|b_{n-m}, \ldots, b_n, \alpha_1, \alpha_2 \ldots \alpha_q)$ should be obtained for all combinations of $(b_{n-m}, \ldots, b_n)$. When the fiber nonlinearity effect is small, $p(I_1(t_i), I_2(t_i)|b_{n-m}, \ldots, b_n, \alpha_1, \alpha_2 \ldots \alpha_q) = p(I_1(t_i), I_2(t_i)| e_m b_{n-m} + \ldots e_0 b_n, \alpha_1, \alpha_2 \ldots \alpha_q)$, where the linear ISI channel characteristics $e_m b_{n-m} + \ldots e_0 b_n$ may be estimated using LMS or RLS algorithm. The parametric method usually requires shorter training sequence length.

Figure 16:
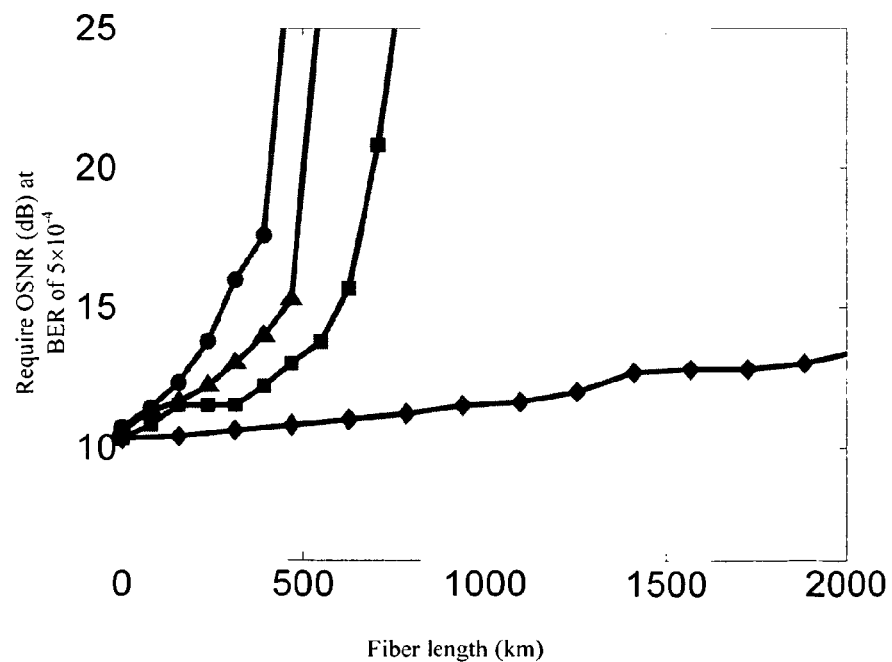
FIG. 16 illustrates the required OSNR to achieve BER of $5 \times 10^{-4}$ versus fiber length for full-field MLSE with various states and hybrid full-field EDC.

Larger m is capable to achieve longer transmission reach but at the expense of exponentially increased implementation complexity. FIG. 16 illustrates the required OSNR to achieve BER of $5 \times 10^{-4}$ for 4-state DD MLSE (shown as circles), 4-state full-field MLSE (shown as triangles), 16-state full-field MLSE (shown as squares), and hybrid full-field EDC comprising a dispersive transmission line and a 16-state full-field MLSE (shown as diamonds).

It is shown that 4-state full-field MLSE had the capability to compensate ~400 km CD, 50% better than DD MLSE owing to knowledge of the recovered phase information. Such complexity would increase to 16 states for 600 km CD compensation or even higher for longer distance. In contrast, by using hybrid EDC comprising a dispersive transmission line and a 16-state full-field MLSE, the transmission reach was extended to 2000 km with the required OSNR less than 15 dB. In the figure, the two inputs of the full-field MLSE were $I_{real}(t)$ and $I_{imag}(t)$.

Figure 17:
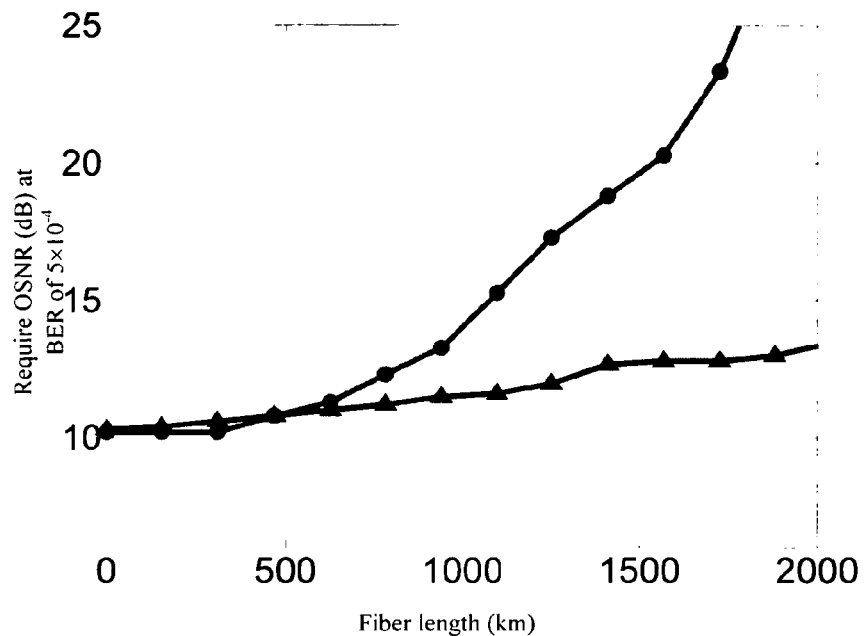
FIG. 17 is an example graph illustrating required OSNR to achieve BER of $5 \times 10^{-4}$ for hybrid full-field EDC without and with the optimization of the filter response in phase estimation.

FIG. 17 illustrates the required OSNR to achieve BER of $5 \times 10^{-4}$ for hybrid full-field EDC comprising a dispersive transmission line and a 16-state full-field MLSE using only a frequency modulator for phase reconstruction (shown as circles) and using a 0.85 GHz high-pass filter followed by a frequency modulator (shown as triangles).

As described above, it is essential to achieve high-quality phase estimation in hybrid full-field EDC by optimizing the system response, which was confirmed by FIG. 17. Similarly, when using the configuration of RC circuit+phase modulator, the optimization of the bandwidth of the RC circuit is also crucial.

Figure 18:
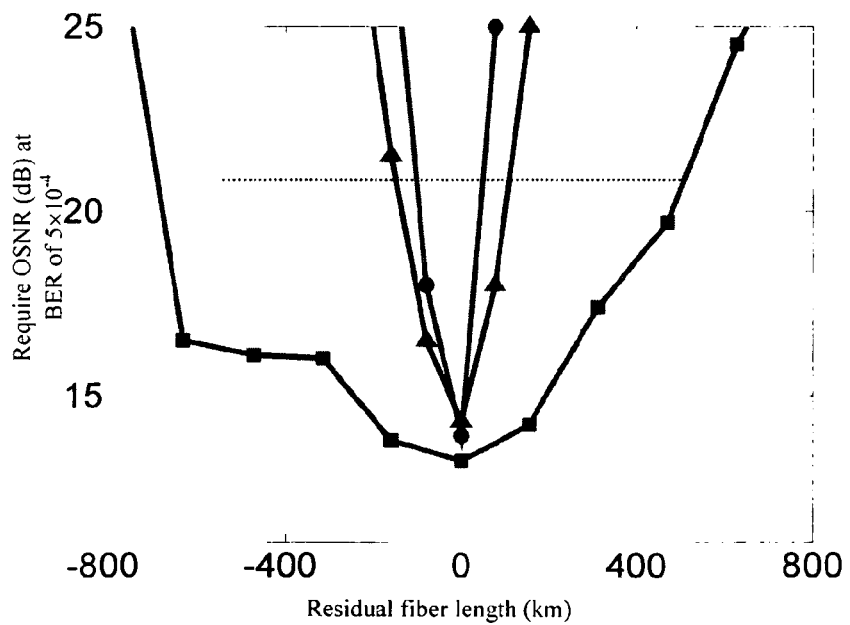
FIG. 18 is an example graph illustrating required OSNR to achieve BER of $5 \times 10^{-4}$ versus residual fibre length at 2000 km using hybrid full-field EDC.

FIG. 18 illustrates the required OSNR to achieve BER of $5 \times 10^{-4}$ versus residual fibre length using dispersive transmission line+direct detection (shown as circles), dispersive transmission line+16-state DD MLSE (shown as triangles) (memory length of 4), and dispersive transmission line+16-state full-field MLSE (shown as squares). The dispersive transmission line was set to fully compensate CD of 2000 km. The lookup table was obtained using nonparametric histogram method. From the figure, it is shown that dispersive transmission line alone or dispersive transmission line+16-state DD MLSE exhibited very limited compensation capability for residual CD, with the CD tolerance range of 1900 km-2100 km. By using dispersive transmission line+full-field MLSE (shown as squares), however, the residual CD tolerance was approximately from −600 km to 400 km (1400 km-2400 km) at 18 dB OSNR. Note that different from FIG. 8, the full-field reconstruction and the dispersive transmission line parts were assumed to be analogue devices (no sampling rate and quantization resolution issues), and DD and full-field MLSE operated at two samples per bit and 5-bit resolution. Thermal noise and fiber nonlinearity were not included in this simulation.

FIGS. 16-18 show results under OSNR limited operation region, without taking account of fibre nonlinearity and thermal noise, representing the maximum achievable performance (FIG. 9-14 included these effects). When these impairments are taken into consideration, some system optimizations are required, including, for example, an AMZI with a larger time delay to enhance the robustness to thermal noise, and proper design of the fibre link configuration to suppress the fibre nonlinearity effect.

Figure 19:
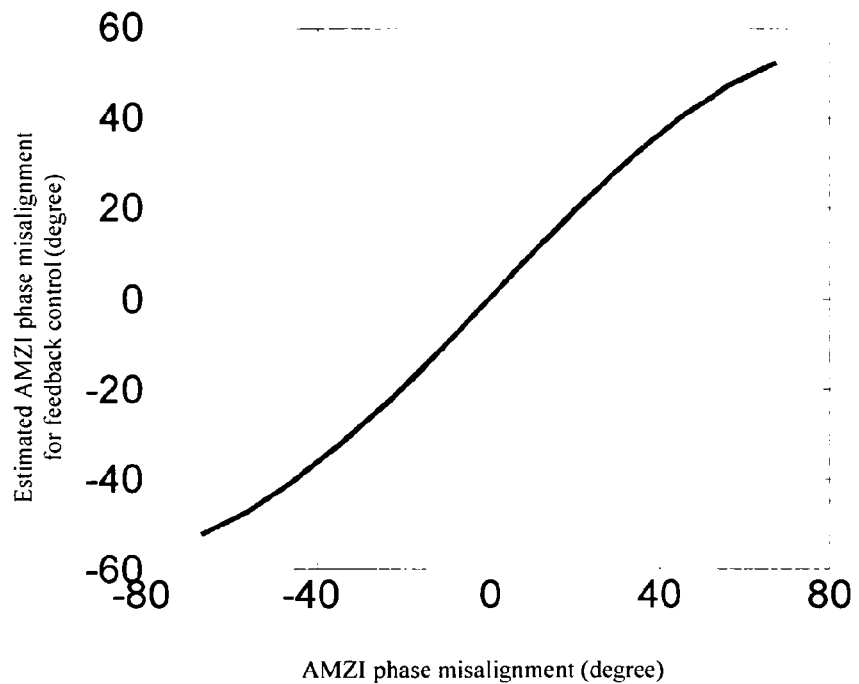
FIG. 19 shows the feedback information of the adaptive algorithm to control the phase of an AMZI.

FIG. 19 shows the estimated phase misalignment of the AMZI from the adaptive control circuit for feedback to control the phase of the AMZI.

The joint probability in the previous metric may be replaced by the multiplication of the individual probability of $I_1(t)$ and $I_2(t)$. Assuming that the inputs of full-field MLSE are the real and imaginary parts of the optical field, the metric, $PM(b_n)$, can also be:

$$PM(b_n) = PM(b_{n-1}) - \sum_i \log(p(I_{real}(t_i)|b_{n-m}, \ldots b_n)p(I_{imag}(t_i)|b_{n-m}, \ldots b_n))$$

This metric can significantly reduce the implementation complexity from $2^{2q+m+2}$ to $2^{q+m+3}$ while with negligible performance penalty under proper system optimization. Although the figures focus on residual CD compensation, hybrid full-field EDC can also use dispersive transmission line to compensate the most important impairment, CD, and employ fast adaptive full-field EDC to mitigate PMD which would become prominent for distance beyond 500 km, and filtering effects in the transmission system.

Figure 20:
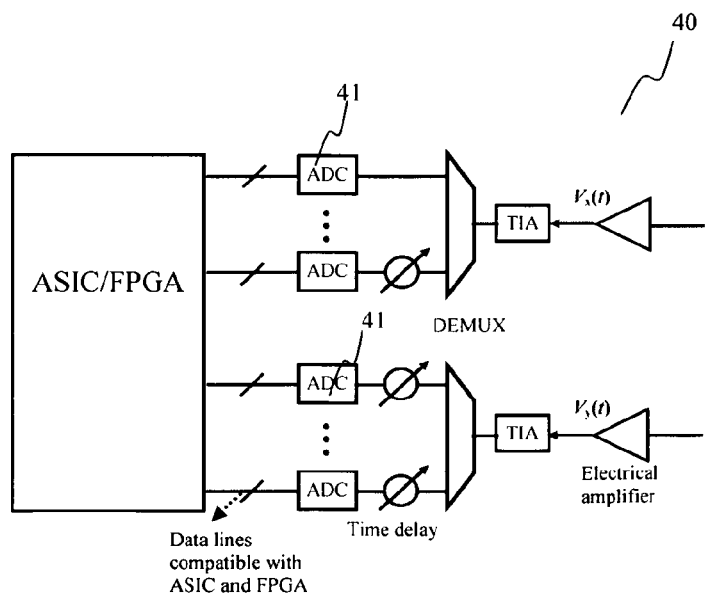
FIG. 20 illustrates another implementation of the system according to the present invention.

Another example of implementation of the technique is shown in FIG. 20, indicated generally by the reference numeral 40. The input signals are sampled by commercial ADCs 41. Depending on the maximum speed of the ADCs and the required sampling rate of the technique, several ADCs may be interleaved with the output consisting of data lines compatible with ASIC and FPGAs.

Figure 21:
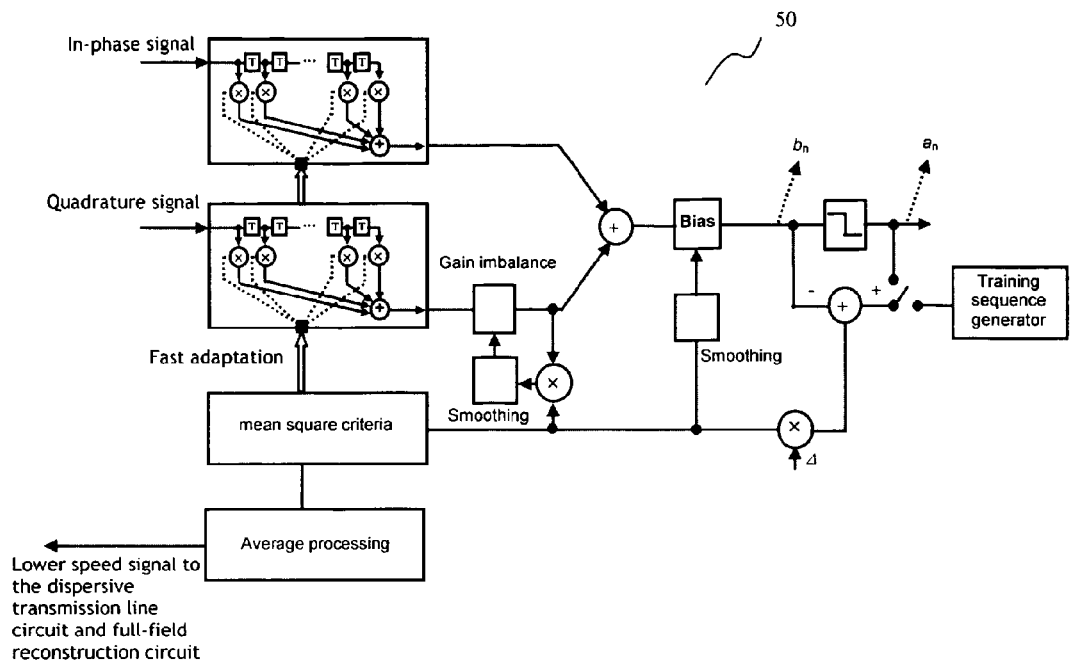
FIG. 21 illustrates an example of a fast-adaptive circuit according to another embodiment of the present invention.

FIG. 21 shows an example of the said fast-adaptive equalization circuit using a full-field feed-forward equalizer, indicated generally by the reference numeral 50. The equalization circuit 50 comprises equalization processors to compensate the impairments. The compensation parameters in the equalization processors are updated on a fast basis to track the quick changes in transmission impairments such as PMD, and/or CD in packet switched networks. The equalization processor also includes the compensation of the gain imbalance between the received electrical signals from the optical-to-electrical converters and the bias added to the intensity receiver path in FIG. 8. The fast adaptive equalization circuit comprises means to generating an error signal ($a_n$-$b_n$ in FIG. 21) and using this error signal to adjust the compensation parameters using adaptive algorithm. To increase the algorithm convergence speed to enable fast tracking of the varied impairments, a large amount of intersymbol interference spans induced by static impairments and coarse dispersion have been removed by the dispersive transmission line such that the tap number required in this fast-adaptive feed-forward equalizer is greatly reduced. This can not only greatly reduce the implementation complexity but also improve the adaptation speed. The algorithm also generates a signal that can be fed back to the prior stage of full-field reconstruction circuit and dispersive transmission line circuit for optimization at a slow basis. Note that the feedback signal usually results in slow tuning but is suitable for the present application because the dispersive transmission line is targeted to compensate the coarse dispersion and other additional static impairments.

Figure 22:
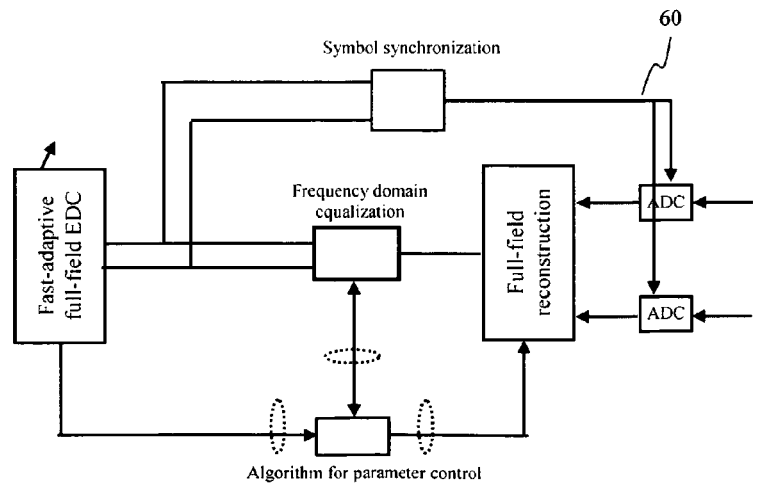
FIG. 22 illustrate an example of symbol synchronization which uses the output signal of the dispersive transmission line circuits to recover the timing and feed it back to control the ADCs.
Figure 23:
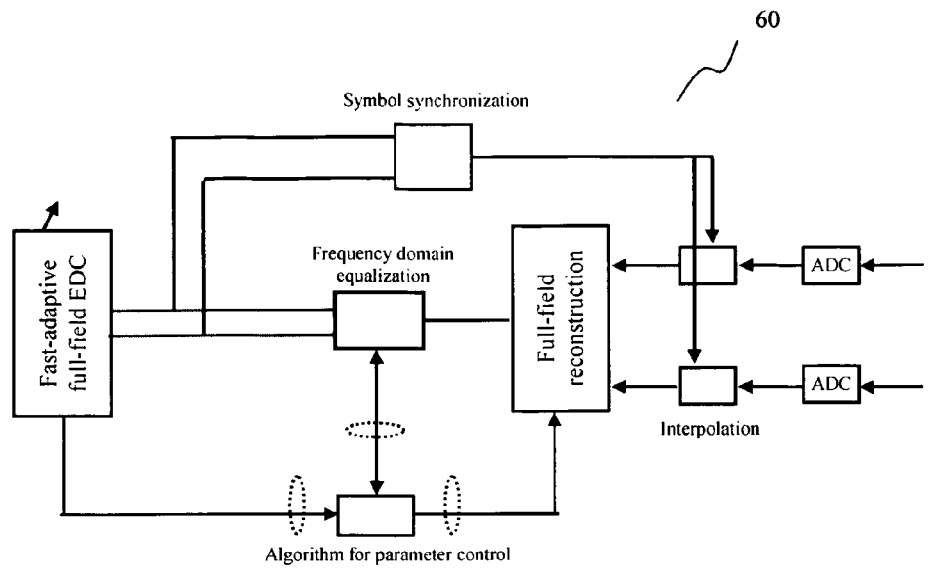
FIG. 23 illustrate another example of the operation for symbol synchronization.

FIGS. 22 and 23 illustrates examples of the operation of symbol synchronization, indicated generally by the reference numeral 60. In fast-varied network configurations, adaptive impairment compensation is required. However, the adaptive algorithms are usually implemented in the digital domain and the signals are sampled by analogue to digital converters. It is important to synchronize the rate of the sampled digital signal with the symbol rate of the transmitted signal. Highly distorted signal causes difficulties on the timing recovery. By using the proposed method, the dispersive transmission line which is not sensitive to the timing synchronization removes most of the impairments (e.g. 10000 ps/nm chromatic dispersion if the dynamic dispersion range of the network is 5000 ps/nm-15000 ps/nm) such that the signal quality has been improved to a certain extent. This will facilitate the timing recovery and enables the use of various timing recovery algorithms which usually have tolerate impairments within a certain range. The recovered timing can be used to control the analogue to digital converters (FIG. 22) or perform interpolations to re-sample the digital signal as shown in FIG. 23.

Figure 24:
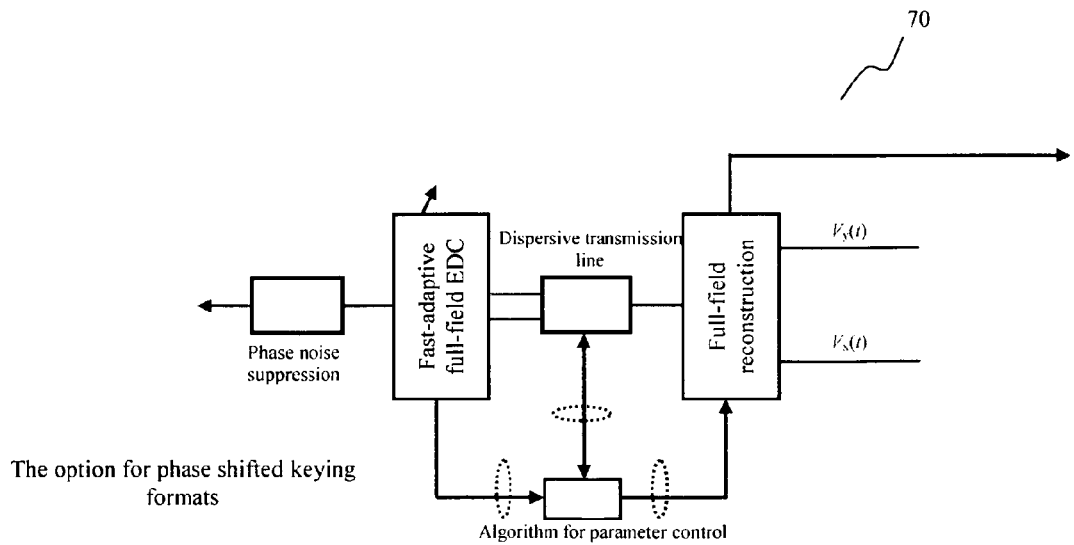
FIG. 24 illustrate an example to add an additional module to further reduce the phase noise after the fast-adaptive equalization circuit in phase modulated signals.

In phase-shifted keying modulation format, an additional compensator can be used after the fast-adaptive equalization circuit to suppress the phase noise 70, as shown in FIG. 24. This option can be implemented by some well-known algorithms such as M-th power algorithm, data-aided maximum likelihood method or other parameters.

The embodiments in the invention described with reference to the drawings comprise a computer apparatus and/or processes performed in a computer apparatus in order to control system and method for use in a communications network. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail.

The invention claimed is:

1. A system, for an optical communication network to compensate impairments in the network, using electronic dispersion compensation, said system comprising:
   two or more optical-to-electrical converters for generating at least two electrical signals, comprising amplitude and instantaneous frequency of a received distorted optical signal, and an electrical circuit adapted to perform a full-field reconstruction of the received distorted optical signal using said electrical signals;
   a dispersive transmission line circuit with compensation parameters updated at a selected rate to process said full-field reconstructed signal and compensate for coarse chromatic dispersion;
   and an adaptive electronic equalization circuit with compensation parameters updated at a rate faster than those in the said dispersive transmission line circuit to provide a fine impairment compensation of said reconstructed signals.

2. The system as claimed in claim 1, comprising at least one asymmetric Mach-Zehnder interferometer.

3. The system as claimed in claim 1 comprising at least one asymmetric Mach-Zehnder interferometer wherein the asymmetric Mach-Zehnder interferometer comprises a differential phase and adapted to be controlled by a signal generated by said full-field reconstruction circuit or said adaptive electronic compensation circuit and/or said full-field reconstruction circuit comprises means for generating at least one signal related to differential phase misalignment of said asymmetric Mach-Zehnder interferometer, wherein said generated signal is adapted to be used for compensating the differential phase misalignment and/or feeding back to control the phase of said asymmetric Mach-Zehnder interferometer to an optimal value.

4. The system as claimed in claim 1 comprising at least one asymmetric Mach-Zehnder interferometer wherein an adaptive algorithm module provides means to control the phase in said at least one asymmetric Mach-Zehnder interferometer to an optimal value, or compensate for the phase misalignment of said at least one asymmetric Mach-Zehnder interferometer after optical-to-electrical conversion.

5. The system as claimed in claim 1 wherein the full-field reconstruction comprises: means for deriving the amplitude and instantaneous frequency of the distorted optical signal using said received electrical signals from the optical-to-electrical converters; means for processing said amplitude and instantaneous frequency signals to generate the full field reconstruction.

6. The system as claimed in claim 1 wherein a gain imbalance between the received electrical signals from the outputs of optical-to-electrical converters is controlled by a signal which is generated by a coarse dispersion compensator and/or adaptive equalization circuit.

7. The system of claim 1 wherein the optical means comprises a power split and an asymmetric Mach-Zehnder interferometer, the outputs are adapted to be detected by a direct detector and a balanced detector; and additional electrical signal processing means to extract the amplitude and the frequency.

8. The system of claim 1 comprising an asymmetric Mach-Zehnder interferometer, with outputs adapted to be detected by two single detectors; and additional electrical signal processing means to extract the amplitude and the frequency.

9. The system as claimed in claim 1 comprising an asymmetric Mach-Zehnder interferometer, with outputs adapted to be detected by two single detectors; and additional electrical signal processing means to extract the amplitude and the frequency wherein the outputs of the said two single detectors are subtracted to generate a signal proportional to the instantaneous frequency of the distorted signal multiplexed by its intensity, or
wherein the outputs of the said two single detectors are summed to generate a signal proportional to the intensity of the distorted signal.

10. The system as claimed in claim 9 wherein the power of the outputs of at least one said detector are controlled to compensate any gain imbalance between said two single detectors.

11. The system as claimed in claim 9 wherein the summed and subtracted signals are processed using means of division and square root to extract the amplitude and instantaneous frequency.

12. The system as claimed in claim 1 wherein the dispersive transmission line circuit with compensation parameters updated at a selected speed is adapted to provide any one or more of: equalizing impairments whose characteristics change at a rate slower than the said selected speed; or whitening the noise in the reconstructed full-field signal.

13. The system as claimed in claim 1 wherein the dispersive transmission line circuit comprises means for analogue processing of the said reconstructed signal using at least one of: a single analogue dispersive transmission line with fixed device parameters; or two or more analogue dispersive transmission lines with fixed device parameters and a switch to select the most appropriate analogue dispersive transmission line.

14. The system as claimed in claim 13, wherein the fixed parameters of the analogue dispersive transmission lines are preset using any one or more of the following: prior known dispersion range of the transmission system or network; dispersion range measured by at least a monitor in the network that is remote from the said electronic compensation system; or static impulse responses of the optical and electrical devices at the transmitter, channel, and receiver.

15. The system as claimed in claim 13 wherein the switch is controlled by using any one of: feedback signal from the said fast-adaptive compensation circuit; or a monitor that is remote from the said electronic compensation system.

16. The system as claimed in claim 13 wherein the analogue dispersive transmission line comprises a filter with a transfer function $\exp(j\beta_2\omega^2 L/2)$ to provide the coarse chromatic dispersion compensation of said reconstructed signals, wherein $\beta_2 L$ is an approximate value based on a prior known value.

17. The system as claimed in claim 1 wherein said dispersive transmission line circuit comprises digital processing means comprising:
a frequency domain equalization; or
a time-domain finite impulse response filter; or
a time-domain infinite impulse response filter and
wherein the digital processing means comprises means for presetting the compensation parameters of the said digital processing means by using any one or more of:
prior known dispersion range of the transmission system or network;
dispersion range measured by at least a monitor in the network that is remote from the said electronic compensation system;
or static impulse responses of the optical and electrical devices at the transmitter, channel, and receiver and/or
wherein the digital processing means comprises means for adjusting the compensation parameters of the said digital processor on a slow basis by using at least one signal generated in the fast-adaptive compensation circuit.

18. The system as claimed in claim 17 wherein the digital processing means comprises means for using any one or more of intermediate and final calculated values to generate at least one signal which is adapted to be fed back to the said field reconstruction circuit and/or wherein the generated signal is used to control at least one parameter that compensates the gain imbalance between the outputs from the optical-to-electrical converters.

19. The system as claimed in claim 1 including digital processing means, using frequency domain equalization, that comprises:
serial-to-parallel conversion;
dividing the converted signal into small blocks and taking Fourier transform for each block;
multiply compensation coefficients;
taking inverse Fourier transform for each block and re-combing small blocks parallel-to-serial conversion.

20. The system as claimed in claim 1 wherein the adaptive equalization circuit comprises means for generating at least one equalization parameter that is updated on a fast basis and an equalization processor that uses at least one fast-updated parameter to process the output of the dispersive transmission line circuit and/or wherein the means for generating the equalization parameters uses any one or more of: input signal of the adaptive equalizer; output signal of the adaptive equalizer; or any calculated intermediate value in the adaptive equalizer and/or wherein the means for generating equalization parameters comprises means for self-adaptively tuning the parameters to perform fine-trimming of dispersion and/or other transmission impairments in said reconstructed signals.

21. The system as claimed in claim 20 wherein said means for generating equalization parameters comprises generating one or more control signals that are updated on a slow basis and fed back to the field reconstruction circuit and/or dispersive transmission line circuit.

22. The system as claimed in claim 1 wherein the adaptive equalization circuit comprises a reduced memory length when combining with the dispersive transmission line circuit.

23. The system as claimed in claim 1 wherein the adaptive equalization circuit is adapted to provide more precise compensation than the dispersive transmission line to compensate for residual impairments in the output of the dispersive transmission line circuit.

24. The system as claimed in claim 1 wherein the adaptive equalization circuit comprises means for compensating gain imbalance between the received electrical signals from the outputs of optical-to-electrical converters, or generating at least one signal related to the said gain imbalance and feeding the said generated signal back to control the gains between the received electrical signals.

25. The system of claim 1 comprising one or more of the following transmission impairments: chromatic dispersion, polarisation mode dispersion, filtering effects in the transmitter, the channel, and the receiver.

26. The system as claimed in claim 1 comprising means for compensating the phase noise in the output signal of the fast-adaptive circuit in any one of: binary or multi-level phase shifted keying format, differential binary or multi-level phase shifted keying, or a combination of amplitude-shifted keying and phase shifted keying and/or wherein said means for compensating phase noise comprises M-th power method and data-aided maximum likelihood.

27. A system, for an optical communication network to compensate impairments in the network comprising:
two or more optical-to-electrical converters for generating at least two electrical signals, comprising the amplitude and instantaneous frequency of a received distorted optical signal;
means for deriving the amplitude and instantaneous frequency of the distorted optical signal using the said received electrical signals from the optical-to-electrical converters;
means for processing the amplitude and instantaneous frequency signals to generate the full field using filter means and multiplication means; and an electrical circuit to compensate impairments in said reconstructed signals; and
means for adaptive electronic equalization with compensation parameters to provide a fine impairment compensation of said reconstructed signals.

28. A system, for an optical communication network to compensate impairments in the network comprising: at least one asymmetric Mach-Zehnder interferometer, and two or more optical-to-electrical converters for generating at least two electrical signals, comprising the amplitude and instantaneous frequency of a distorted optical signal; an electrical circuit adapted to perform a full-field reconstruction using said signals; and means for compensating impairments in said reconstructed signals; and means for adaptively generating at least one parameter or signal that is related to the differential phase misalignment of the asymmetric Mach-Zehnder interferometer in the said electrical circuit, and an adaptive electronic equalization circuit with compensation parameters to provide a fine impairment compensation of said reconstructed signals.

* * * * *